(12) United States Patent
Hiramatsu

(10) Patent No.: US 11,274,931 B2
(45) Date of Patent: Mar. 15, 2022

(54) ROUTE GENERATION SYSTEM, AND AUTONOMOUS TRAVEL SYSTEM CAUSING WORK VEHICLE TO TRAVEL ALONG ROUTE GENERATED THEREBY

(71) Applicant: Yanmar Co., Ltd., Osaka (JP)

(72) Inventor: Toshifumi Hiramatsu, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 216 days.

(21) Appl. No.: 16/480,282

(22) PCT Filed: Nov. 22, 2017

(86) PCT No.: PCT/JP2017/041941
§ 371 (c)(1),
(2) Date: Jul. 23, 2019

(87) PCT Pub. No.: WO2018/139024
PCT Pub. Date: Aug. 2, 2018

(65) Prior Publication Data
US 2020/0033143 A1 Jan. 30, 2020

(30) Foreign Application Priority Data

Jan. 27, 2017 (JP) .............................. JP2017-012616

(51) Int. Cl.
*G01C 21/34* (2006.01)
*G05D 1/00* (2006.01)

(52) U.S. Cl.
CPC .......... *G01C 21/34* (2013.01); *G05D 1/0088* (2013.01)

(58) Field of Classification Search
CPC ................. G01C 21/24; G05D 1/0088; G05D 2201/0201; G05D 1/0219; A01B 69/008
See application file for complete search history.

(56) References Cited

U.S. PATENT DOCUMENTS

2004/0068352 A1 4/2004 Anderson
2012/0179322 A1* 7/2012 Hennessy ............ G05D 1/0278
701/25

(Continued)

FOREIGN PATENT DOCUMENTS

JP H08-205610 A 8/1996
JP 08-263140 A 10/1996

(Continued)

OTHER PUBLICATIONS

Japanese Office Action dated Aug. 1, 2019 issued in corresponding JP Application 2017-012616 cites the patent documents above.

(Continued)

*Primary Examiner* — Marthe Y Marc-Coleman
(74) *Attorney, Agent, or Firm* — Norton Rose Fulbright US LLP

(57) ABSTRACT

A route generating system in which a work vehicle setting unit sets a vehicle information on a tractor. An altitude information obtaining unit of the route generating system obtains an altitude information on a field where an autonomous travel route is to be generated, and a traveling direction setting unit thereof sets a traveling direction of the tractor in the field. A region setting unit of the route generating system sets, in the field, a plurality of regions including a work region where autonomous work paths in parallel with the traveling direction are generated and headlands where connection paths each connecting corresponding ones of the autonomous work paths are generated. The region setting unit sets the widths of the headlands (headland widths) based on the vehicle information, the altitude information, and the traveling direction, the widths of the headlands extending in parallel with the traveling direction.

5 Claims, 14 Drawing Sheets

(56) References Cited

U.S. PATENT DOCUMENTS

| | | | | |
|---|---|---|---|---|
| 2017/0168501 A1* | 6/2017 | Ogura | ............... | G05D 1/0038 |
| 2017/0300064 A1* | 10/2017 | Wolters | ............... | G05D 1/0217 |
| 2018/0024563 A1* | 1/2018 | Matsuzaki | ......... | G01C 21/3461 |
| | | | | 701/41 |

FOREIGN PATENT DOCUMENTS

| | | |
|---|---|---|
| JP | H10-243708 A | 9/1998 |
| JP | 2014-130094 A | 7/2014 |
| JP | 2016-123378 A | 7/2016 |
| JP | 2016-137979 A | 11/2016 |
| JP | 2016-189051 A | 11/2016 |
| WO | 2015/119264 A1 | 8/2015 |

OTHER PUBLICATIONS

International Search Report dated Aug. 2, 2018 issued in corresponding PCT Application PCT/JP2017/041941 cites the patent documents above.

* cited by examiner

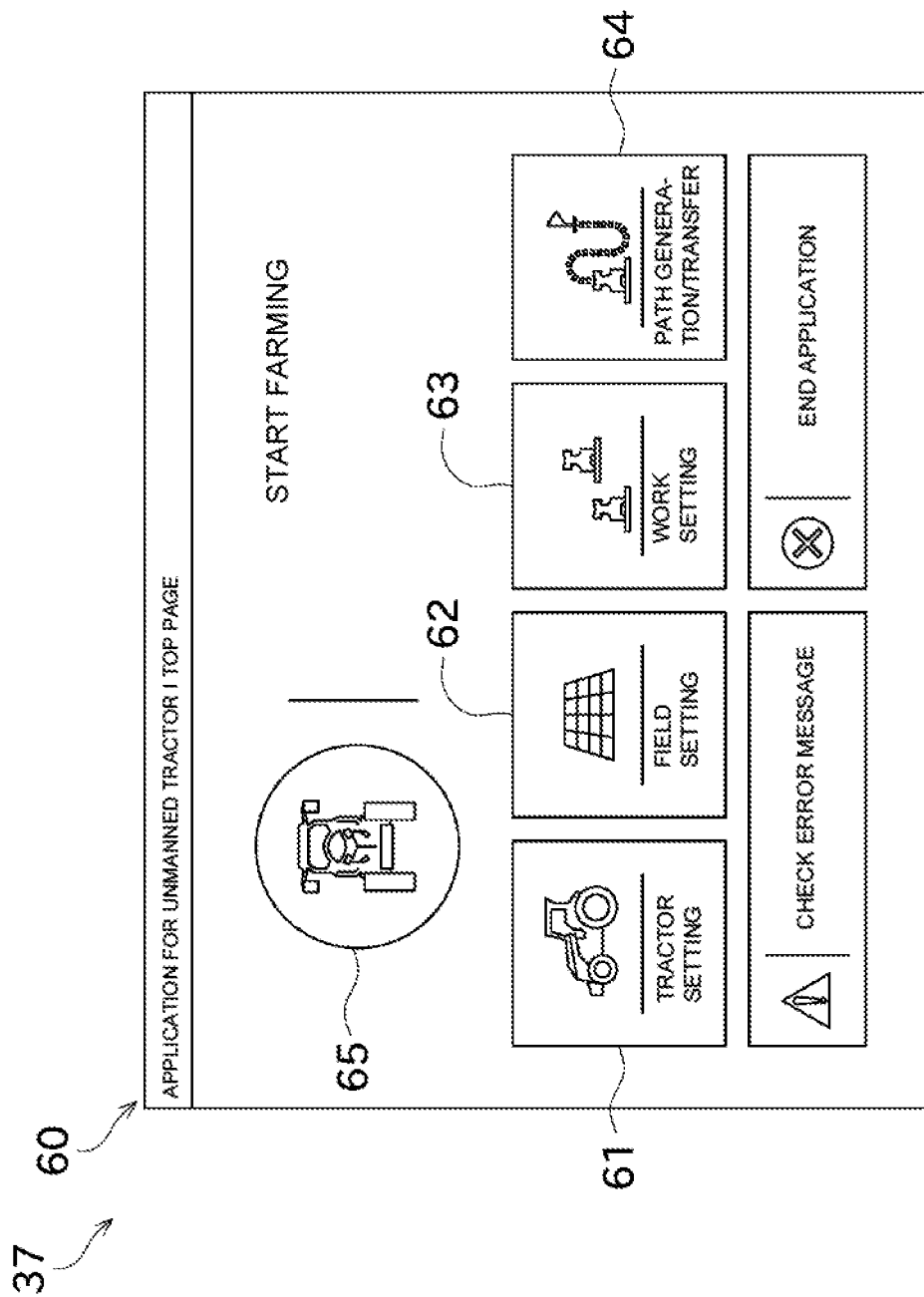

FIG. 7

APPLICATION FOR UNMANNED TRACTOR | WORK VEHICLE SETTING

| | |
|---|---|
| MODEL OF TRACTOR | ▷ |
| SIZE OF TRACTOR | ▷ |
| ATTACHMENT POSITION OF POSITION MEASURING ANTENNA | ▷ |
| WIDTH OF WORK MACHINE | ▷ |
| DISTANCE TO REAR END OF WORK MACHINE | ▷ |
| VEHICLE SPEED DURING WORK (FIRST VEHICLE SPEED) | ▷ |
| VEHICLE SPEED ON HEADLAND (SECOND VEHICLE SPEED) | ▷ |
| ENGINE SPEED DURING WORK | ▷ |
| ENGINE SPEED ON HEADLAND | ▷ |
| TURNING RADIUS | ▷ |
| ... | ... |

APPLICATION FOR UNMANNED TRACTOR I FIELD SETTING

| FIELD OUTER PERIPHERY POSITION AND SHAPE | RECORD START | RESET |
| WORK START POSITION | SET | RESET |
| WORK END POSITION | | |
| WORK DIRECTION | | |
| ALTITUDE INFORMATION | | |

APPLICATION FOR UNMANNED TRACTOR I INCLINED PLANE COUNTERMEASURE SETTING

PITCH-DIRECTION INCLINATION IN WORK DIRECTION HAS BEEN DETECTED. PLEASE SELECT COUNTERMEASURE AGAINST SLIP-DOWN AT THE TIME OF TURNING ON HEADLAND.

☑ INCREASE HEADLAND WIDTH : [XX] m

REGISTER  RETURN

APPLICATION FOR UNMANNED TRACTOR I FIELD SETTING FIELD SETTING

| FIELD OUTER PERIPHERY POSITION AND SHAPE | RECORD START | RESET |
| WORK START POSITION | SET | RESET |
| WORK END POSITION | APPLICATION FOR UNMANNED TRACTOR I INCLINED PLANE COUNTERMEASURE SETTING |
| WORK DIRECTION | |
| ALTITUDE INFORMATION | |

PITCH-DIRECTION INCLINATION IN WORK DIRECTION HAS BEEN DETECTED. PLEASE SELECT COUNTERMEASURE AGAINST SLIP-DOWN AT THE TIME OF TURNING ON HEADLAND.

☑ INCREASE HEADLAND WIDTH : [ XX ] m

☑ CHANGE TURNING RADIUS : [ XX ] m

[REGISTER]  [RETURN]

ROUTE GENERATION SYSTEM, AND AUTONOMOUS TRAVEL SYSTEM CAUSING WORK VEHICLE TO TRAVEL ALONG ROUTE GENERATED THEREBY

CROSS REFERENCES TO RELATED APPLICATIONS

This application is a national stage application pursuant to 35 U.S.C. § 371 of International Application No. PCT/JP2017/041941, filed on Nov. 22, 2017 which claims priority under 35 U.S.C. § 119 to Japanese Patent Application No. 2017-012616 filed on Jan. 27, 2017, the disclosures of which are hereby incorporated by reference in their entireties.

TECHNICAL FIELD

The present invention relates to a route generating system and an autonomous travel system causing a work vehicle to travel along a route generated by the route generating system.

BACKGROUND ART

Heretofore, there has been known a route generating system for generating a route along which a work vehicle performs autonomous travel. Patent Document 1 (hereinafter, referred to as PTL 1) discloses this type of route generating system (travel route generating device). According to the travel route generating device of PTL 1, work-field shape measuring means measures a three-dimensional shape of a field. Based on the information on the measured three-dimensional shape of the field, data of a planned travel route for causing a work vehicle to travel in the field is generated.

The travel route generating device of PTL 1 determines an inclination of, e.g., the entire field based on the information on the measured three-dimensional shape of the field. Thus, the travel route generating device of PTL 1 can set the planned travel route for the work vehicle in consideration of the fact that a work width, in which a work machine performs work, is narrower on the surface of the inclined work field than a width in a plan view. PTL 1 states that this configuration can reliably prevent a disadvantageous situation as below. That is, in a case where a work route is set on the field simply based on the work width of the work machine viewed in a plan view as in a conventional way, a work width in which work is actually performed is smaller than a width in which the work is ought to be performed on the work region. This may result in an unworked region formed in the boundary between adjacent routes.

CITATION LIST

Patent Literature

PTL 1: Japanese Patent Application Laid-Open No. H10-243708 (1998)

SUMMARY OF INVENTION

Technical Problem

Although the travel route generating device of PTL 1 generates the planned travel route in consideration of the situation in which the field has a roll-direction inclination relative to the orientation of the vehicle body that is traveling in a straight line and performing work, the travel route generating device of PTL 1 does not give any particular consideration on a pitch-direction inclination. In this point, the travel route generating device of PTL 1 still has room for improvement. Specifically, in a case where the field has a pitch-direction inclination relative to the vehicle body that is traveling in a straight line, the work vehicle may potentially slide down by its own weight and depart outside the field while the work vehicle is making a turn on a headland. There has been a demand for reliably preventing such a situation.

Some aspects of the present invention have been made in view of the circumstances above. An object of some aspects of the present invention is to provide a route generating system for generating, for a work vehicle, an autonomous travel route including routes being in parallel with a traveling direction and connection paths each connecting corresponding ones of the routes, in such a manner as to prevent the work vehicle from departing outside a field due to slide-down at the time of traveling on the connection path, even in a case where a region in which the autonomous travel route is generated has a pitch-direction inclination in the traveling direction.

Solution to Problem and Advantageous Effects of Invention

The problem to be solved by the present invention has been described above. Next, the following will describe solutions to this problem and effects achieved by the solutions.

A first aspect of the present invention provides a route generating system including the following features. That is, the route generating system generates a route along which a work vehicle performs autonomous travel. The route generating system includes a work vehicle setting unit, an altitude information obtaining unit, a traveling direction setting unit, and a region setting unit. The work vehicle setting unit is configured to obtain vehicle information on the work vehicle. The altitude information obtaining unit is configured to obtain altitude information on a specific region where the route is to be generated. The traveling direction setting unit is configured to set a traveling direction of the work vehicle in the specific region. The region setting unit is configured to set, in the specific region, a plurality of regions including a first region where routes being in parallel with the traveling direction are generated and second regions where connection paths each connecting corresponding ones of the routes are generated. The region setting unit sets widths of the second regions based on the vehicle information, the altitude information, and the traveling direction, the widths of the second regions extending in parallel with the traveling direction.

With this, the widths of the second regions are set in consideration of the altitude information and the traveling direction. Therefore, for example, in a case where the second regions have a pitch-direction inclination in the traveling direction, the widths of the second regions can be achieved in consideration of slide-down of the work vehicle that may occur by its own weight at the time of traveling in the second region. Consequently, it is possible to prevent the work vehicle from departing outside the specific region.

The route generating system is preferably configured such that the region setting unit sets the second regions respectively on first and second sides of the first region in the traveling direction, and the region setting unit sets, among the second regions on the first and second sides, one of the second regions located on a lower side to have a width larger than a width of the other of the second regions located on a higher side, based on the altitude information.

With this, for example, in a case where the specific region is an inclined field with two second regions having a difference of altitude, the width of the one of the headlands on the lower side, on which the weight of the work vehicle is likely to be applied toward the outside of the field, can be set wider. Consequently, it is possible to effectively prevent the work vehicle from departing outside the field.

The route generating system described above preferably includes the following feature. That is, the work vehicle setting unit sets, as the vehicle information, a turning radius of the work vehicle. The work vehicle setting unit sets, as the turning radius, a turning radius larger than a preset reference turning radius based on the altitude information and the traveling direction.

With this, in a case where the second regions have an inclination, a turning radius of the work vehicle at the time of making a turn in the second regions can be set larger. This makes it possible to prevent slide-down of the work vehicle.

The route generating system described above preferably includes the following feature. That is, the route generating system includes a turning radius designating unit configured to accept, as the turning radius, designation of an arbitrary turning radius. In a case where the turning radius designating unit accepts the designation of the arbitrary turning radius, the work vehicle setting unit sets, as the turning radius of the work vehicle, the arbitrary turning radius according to the designation.

In this manner, the user can designate the turning radius. Consequently, it is possible to take a countermeasure against the inclined plane independently of the altitude information on the specific region and the turning characteristics of the work vehicle.

A second aspect of the present invention provides an autonomous travel system causing a work vehicle to perform autonomous travel along a route generated by the route generating system described above. The autonomous travel system is configured such that the work vehicle setting unit includes a vehicle speed setting unit configured to set a first vehicle speed of the work vehicle in the first region and a second vehicle speed of the work vehicle in the second regions. The autonomous travel system includes an autonomous travel control unit configured to control autonomous travel of the work vehicle. The autonomous travel control unit controls, based on the altitude information, a vehicle speed of the work vehicle in the second regions to be a third vehicle speed, which is lower than the second vehicle speed.

With this, in a case where the second regions have an inclination, a vehicle speed of the work vehicle at the time of making a turn on the second region can be controlled to be lower than a preset vehicle speed. This makes it possible to prevent slide-down of the work vehicle.

BRIEF DESCRIPTION OF DRAWINGS

FIG. 6 A view illustrating a display example of an entry/selection screen on a display of the wireless communication terminal.

FIG. 7 A view illustrating a display example of a work vehicle information entry screen on the display of the wireless communication terminal.

FIG. 9 A view illustrating a display example of an inclined plane countermeasure setting window on the display of the wireless communication terminal, the inclined plane countermeasure setting window being used to set a countermeasure against slide-down.

FIG. 10 A view illustrating another display example of the inclined plane countermeasure setting window.

DESCRIPTION OF EMBODIMENTS

Figure 1:
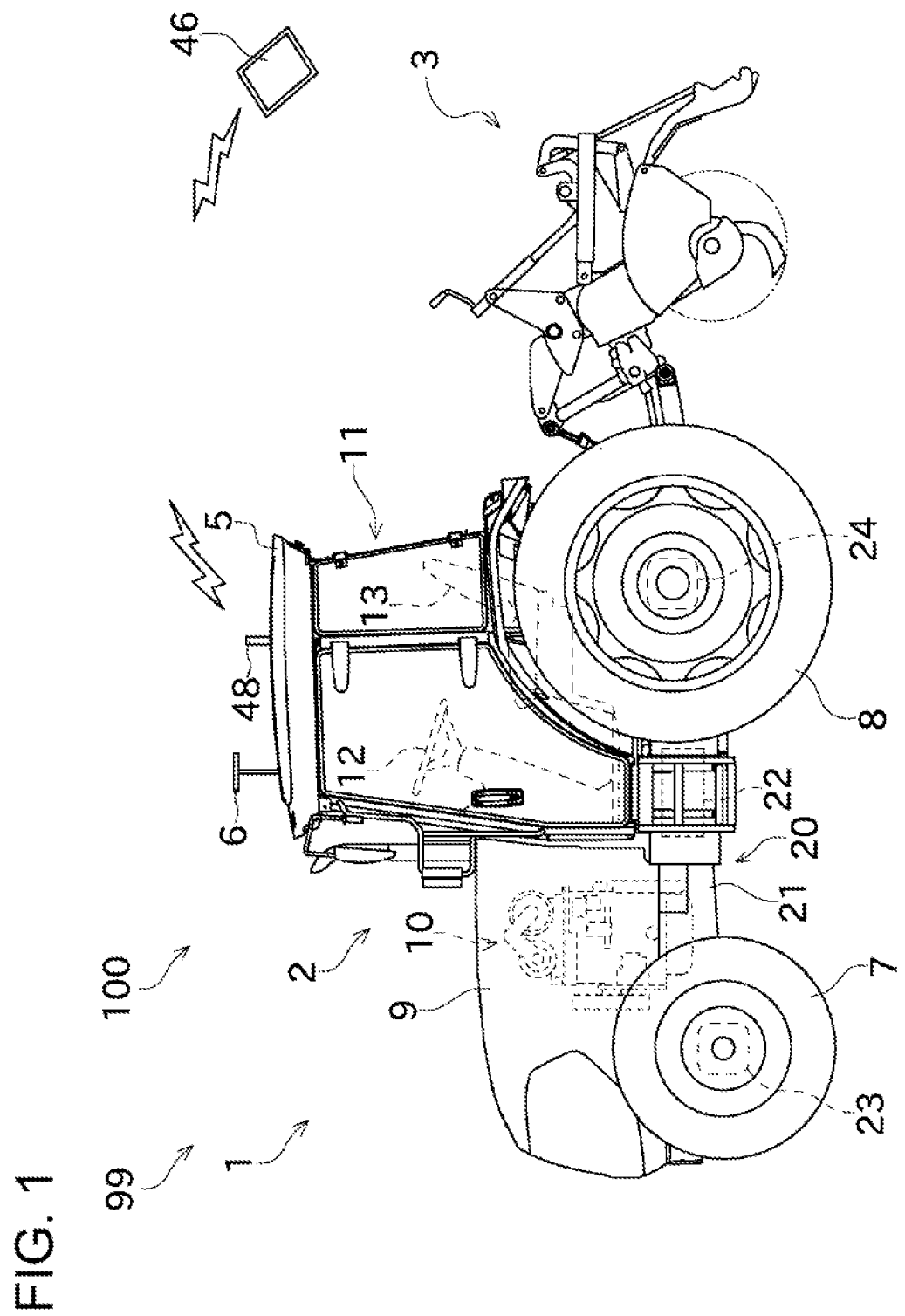
FIG. 1 A side view of an overall configuration of a robot tractor that is to travel autonomously along a route generated by a route generating system according to one embodiment of the present invention.

Next, with reference to the drawings, embodiments of the present invention will be described. In each of the drawings, the same reference signs are given to the same elements, and overlapped description thereof may be omitted occasionally. Moreover, the designation of the element or the like corresponding to the same reference sign may be translated simply or may be translated into a broader term or a narrower term.

The present invention relates to a route generating system for generating a travel route along which a single work vehicle or a plurality of work vehicles is to travel in order that the single work vehicle or the plurality of work vehicles travels in a predetermined field to perform farm work entirely or partially within the field. The present invention relates to an autonomous travel system causing a work vehicle to travel along a route generated by the route generating system. In the present embodiment, the description will be given of a tractor as one example of the work vehicle. In addition to the tractor, examples of the work vehicle include a riding-type working machine such as a rice transplanter, a combine harvester, a civil engineering and construction work machine, and a snowplow, as well as a walking-type work machine. In Description herein, autonomous travel means that a tractor is caused to travel along a predetermined route by controlling, by a control unit (electrical control unit: ECU) of the tractor, a configuration of the tractor associated with traveling. Autonomous work means that a tractor is caused to perform work along a predetermined route by controlling, by the control unit of the tractor, a configuration of the tractor associated with work. In contrast to this, manual travel and manual work mean that travel and work are performed by user's operation of each of the configuration of the tractor.

In the following description, a tractor that is to perform the autonomous travel and the autonomous work is referred to as an "unmanned tractor" or a "robot tractor" occasionally, whereas a tractor that is to perform the manual travel and the manual work is referred to as a "manned tractor" occasionally. In the field, when a part of farm work is performed by the unmanned tractor, the rest of the farm work is performed by the manned tractor. Farm work in a single field performed by the unmanned tractor and the manned tractor is referred to as cooperative farm work, track farm work, following farm work, or the like occasionally. The unmanned tractor and the manned tractor herein differ from each other in presence of user's operation, and are basically common in each element. That is, the user can ride on (get on) and operate the unmanned tractor (i.e., the user can use the tractor as the manned tractor). Meanwhile, the user can get off the manned tractor and cause the tractor to perform the autonomous travel and the autonomous work (i.e., the user can use the tractor as the unmanned tractor). The cooperative farm work may include not only "performing farm work within a single field by an unmanned vehicle and a manned vehicle" but also "performing farm work in different fields, such as adjacent fields, by an unmanned vehicle and a manned vehicle at the same time."

Figure 2:
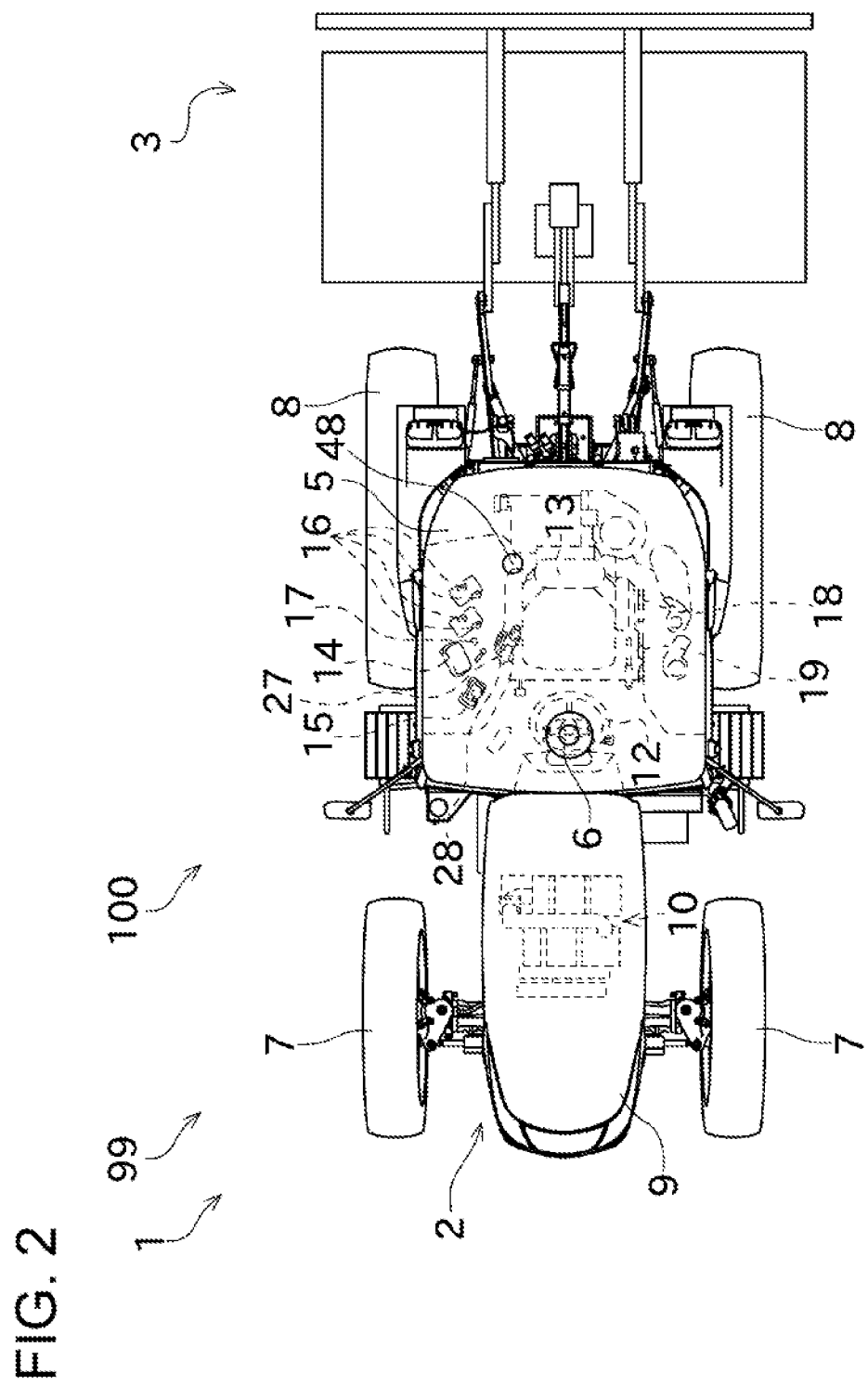
FIG. 2 A plan view of the robot tractor.
Figure 3:
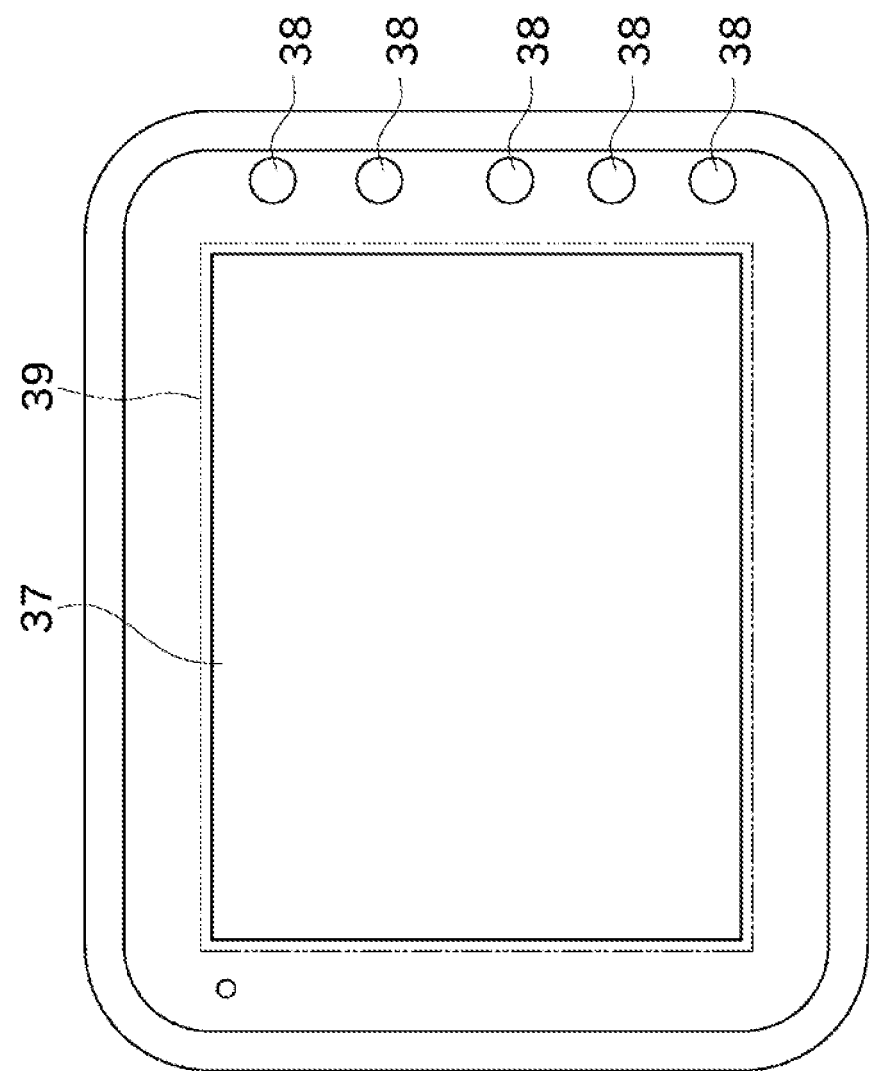
FIG. 3 A view illustrating a wireless communication terminal that is operated by a user to perform wireless communication with the robot tractor.
Figure 4:
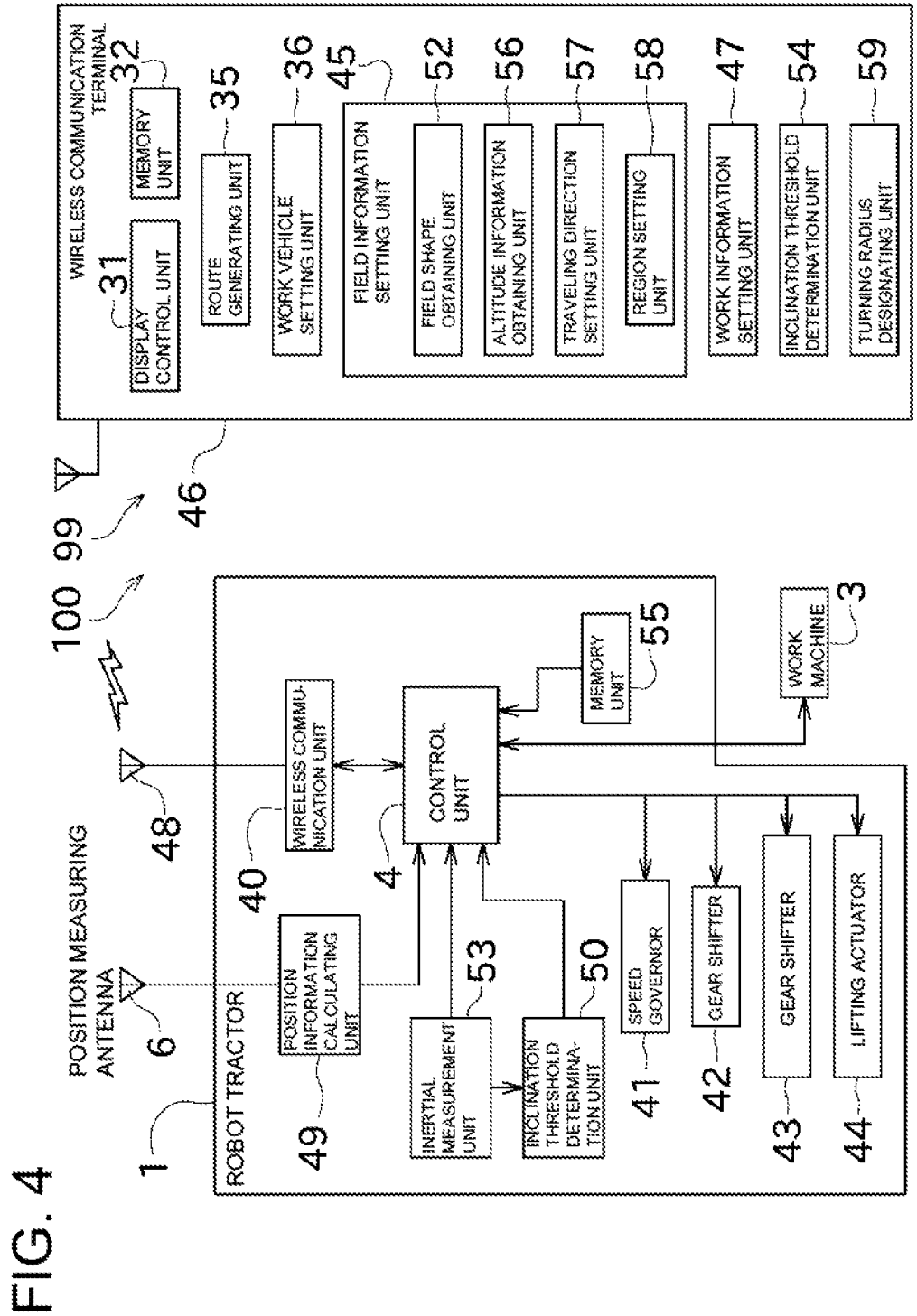
FIG. 4 A block diagram illustrating main electrical configurations of the robot tractor and the wireless communication terminal.

Next, with reference to the drawings, embodiments of the present invention will be described. FIG. 1 is a side view of an overall configuration of a robot tractor 1 that is to travel autonomously along a route generated by a route generating system 99 according to one embodiment of the present invention. FIG. 2 is a plan view of the robot tractor 1. FIG. 3 illustrates a wireless communication terminal 46 that is operated by a user to perform wireless communication with the robot tractor 1. FIG. 4 is a block diagram illustrating main electrical configurations of the robot tractor 1 and the wireless communication terminal 46.

Figure 5:
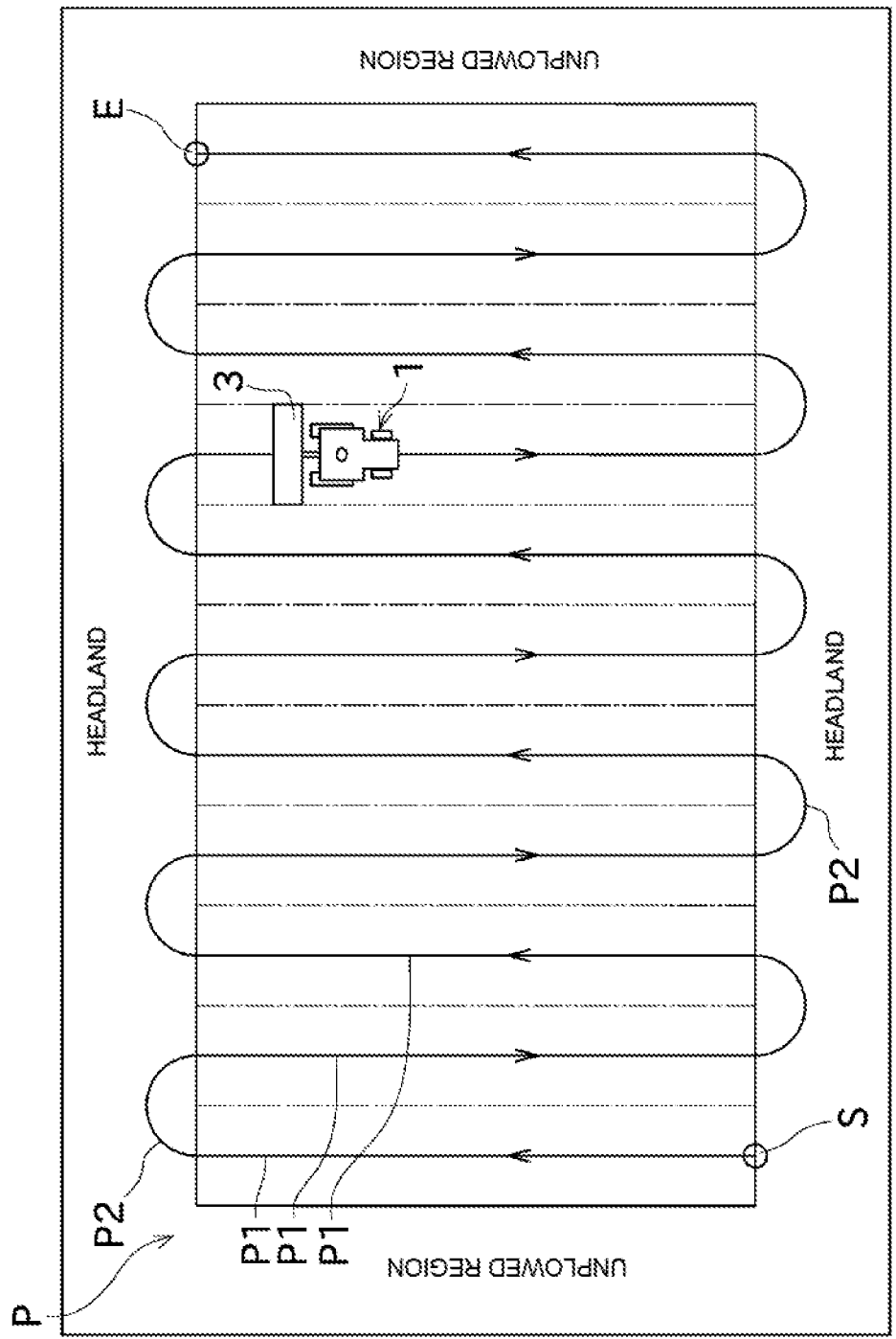
FIG. 5 A view schematically illustrating an example of an autonomous travel route, which is a route generated by the route generating system.

The route generating system 99 according to the one embodiment of the present invention is configured to generate an autonomous travel route (route) P along which the robot tractor 1 shown in FIG. 1 is to travel for autonomous travel and autonomous work (see FIG. 5). In the present embodiment, the main features of the route generating system 99 are included in the wireless communication terminal 46 communicable with the robot tractor 1.

An autonomous travel system 100 according to one embodiment of the present invention is configured to cause the robot tractor 1 to travel autonomously along an autonomous travel route P generated by the route generating system 99.

First, description will be given of the robot tractor (hereinafter, simply referred to as a "tractor" occasionally) 1 with reference to FIGS. 1 and 2.

The tractor 1 includes a traveling body 2 serving as a vehicle body that can perform autonomous travel within a field region (specific region). To the traveling body 2, a work machine can be attached. The work machine may be selected from various types of work machines such as tillers (cultivators), plows, fertilizers, mowers, and seeders. In the present embodiment, a work machine 3 that is a rotary tiller is attached to the traveling body 2.

With reference to FIGS. 1 and 2, the following describes further details of the configuration of the tractor 1. As illustrated in FIG. 1, the traveling body 2 of the tractor 1 includes a front part supported by paired right and left front wheels 7, and a rear part supported by paired right and left rear wheels 8.

The traveling body 2 has an engine hood 9 disposed in the front part thereof. In the present embodiment, stored within the engine hood 9 are an engine 10 as a drive source of the tractor 1, a fuel tank (not shown), and the like. The engine 10 may be a diesel engine, for example. However, this is not limitative. For instance, the engine 10 may be a gasoline engine. Instead of or in addition to the engine 10 as the drive source, an electric motor may be used. The fuel tank may alternatively be disposed outside the engine hood 9.

A cabin 11 where the user rides is disposed behind the engine hood 9. The cabin 11 mainly includes, inside thereof, a steering handle 12 to be steered by the user, a seat 13 where the user is able to sit, and various operating devices for performing various types of operation. However, the work vehicle with the cabin 11 is not limitative. Alternatively, the work vehicle without the cabin 11 may be used.

Examples of the operating devices include a monitor 14, a throttle lever 15, a main shift lever 27, a plurality of hydraulic control levers 16, a power take-off (PTO) switch 17, a PTO shift lever 18, a sub-shift lever 19, and a work machine lifting switch 28, which are illustrated in FIG. 2. These operating devices are disposed adjacent to the seat 13 or the steering handle 12.

The monitor 14 is capable of displaying various kinds of information about the tractor 1. The throttle lever 15 is an operation tool for setting an output speed of the engine 10. The main shift lever 27 is an operation tool for steplessly changing a traveling speed of the tractor 1. The hydraulic control lever 16 is an operation tool for switching an external hydraulic takeoff valve (not shown). The PTO switch 17 is an operation tool for switching transmission/break of power to an unillustrated PTO shaft (power transmission shaft) that protrudes from the rear end of a transmission 22. Specifically, if the PTO switch 17 is in an ON-state, power is transmitted to the PTO shaft, thereby causing the PTO shaft to rotate. Meanwhile, if the PTO switch 17 is in an OFF-state, power to the PTO shaft breaks, thereby causing the PTO shaft to stop rotating. The PTO shift lever 18 is an operation tool for shifting a rotation speed of the PTO shaft. The sub-shift lever 19 is an operation tool for switching a gear ratio of a sub-traveling speed shift gear mechanism in the transmission 22. The work machine lifting switch 28 is an operation tool for up-down operation in level of the work machine 3 attached to the traveling body 2 within a predetermined range.

As illustrated in FIG. 1, the tractor 1 includes a chassis 20 provided at a lower part of the traveling body 2. The chassis 20 is constituted by a body frame 21, the transmission 22, a front axle 23, and a rear axle 24, for example.

The body frame 21 is a support member at the front part of the tractor 1, and supports the engine 10 directly or via a vibro-isolating material, for example. The transmission 22 is configured to change power from the engine 10 and transmit the power to the front axle 23 and the rear axle 24. The front axle 23 is configured to transmit the power from the transmission 22 to the front wheels 7. The rear axle 24 is configured to transmit the power from the transmission 22 to the rear wheels 8.

As illustrated in FIG. 4, the tractor 1 includes a control unit (autonomous travel control unit) 4 that controls movement (e.g., forward movement, rearward movement, stop, and turn) of the traveling body 2 and movement (e.g., lift, drive, and stop) of the work machine 3. The control unit 4 includes a CPU, a ROM, a RAM, and an I/O (each not shown), for example. The CPU can read various programs and/or the like from the ROM and execute the programs and/or the like. The control unit 4 is electrically connected to controllers and a wireless communication unit 40, for example. The controllers control elements (e.g., the engine 10) of the tractor 1. The wireless communication unit 40 enables wireless communication with another wireless communication unit.

The tractor 1 includes, as the above controllers, at least an engine controller, a vehicle speed controller, a steering controller, and a lifting controller (each not shown). Each of the controllers can control a corresponding one of the elements of the tractor 1 according to an electric signal from the control unit 4.

The engine controller controls the speed of the engine 10, for example. Specifically, the engine 10 includes a speed governor 41 with an actuator (not shown), which is configured to change the speed of the engine 10. The engine controller controls the speed governor 41, thereby controlling the speed of the engine 10. The engine 10 further includes a fuel injection device that controls a timing and an amount of fuel injected (supplied) into a combustion chamber of the engine 10. The engine controller controls the fuel injection device to stop fuel supply to the engine 10, thereby stopping driving of the engine 10.

The vehicle speed controller controls the vehicle speed of the tractor 1. Specifically, the transmission 22 includes a gear shifter 42 such as a hydraulic continuously variable transmission of movable swash plate type. The vehicle speed controller causes an actuator (not shown) to change an angle of a swash plate of the gear shifter 42, thereby changing a gear ratio of the transmission 22 to obtain a desired vehicle speed.

The steering controller controls a rotational angle of the steering handle 12. Specifically, a steering actuator 43 is disposed halfway a rotary shaft (steering shaft) of the steering handle 12. In order to cause the tractor 1 to travel on a predetermined route under such a configuration, the control unit 4 calculates a suitable rotational angle of the steering handle 12 so as to cause the tractor 1 to travel along the route. The control unit 4 outputs a control signal to the steering controller so that the rotational angle of the steering handle 12 matches the calculated rotational angle. The steering controller drives the steering actuator 43 according to the control signal from the control unit 4 to control the rotational angle of the steering handle 12. Alternatively, the steering controller may control a steering angle of the front wheels 7 of the tractor 1, rather than the rotational angle of the steering handle 12. In such a configuration, the steering handle 12 would not be rotated even when the tractor 1 makes a turn.

The lifting controller controls up and down movement of the work machine 3. Specifically, the tractor 1 includes a lifting actuator 44 constituted by, e.g., a hydraulic cylinder. The lifting actuator 44 is disposed adjacent to a three-point link mechanism that connects the work machine 3 to the traveling body 2. The lifting controller drives the lifting actuator 44 according to a control signal from the control unit 4 under such a configuration, so as to cause the work machine 3 to move upwardly and downwardly appropriately. This allows support of the work machine 3 at a desired level, such as a retracting level (a level where no farm work is performed) and a work level (a level where farm work is performed), so as to cause the work machine 3 to perform farm work.

The above-described unillustrated controllers control their corresponding elements, such as the engine 10, according to the signals from the control unit 4. From this, it can be understood that the control unit 4 substantially controls the elements.

The tractor 1 provided with the above-described control unit 4 is configured to allow the user riding in the cabin 11 to execute various types of operation to cause the control unit 4 to control the components (the traveling body 2, the work machine 3, and/or the like) of the tractor 1 so that the tractor 1 can perform farm work while traveling within the field. In addition, the tractor 1 of the present embodiment is capable of performing autonomous travel and autonomous work according to various control signals outputted from the wireless communication terminal 46 even when the operator does not ride on the tractor 1.

Specifically, as illustrated in, e.g., FIG. 4, the tractor 1 includes various components that enable autonomous travel and autonomous work. For instance, the tractor 1 includes, e.g., a position measuring antenna 6 required to obtain position information on itself (traveling body 2) from a position measuring system. With such a configuration, the tractor 1 is capable of obtaining the position information on itself from the position measuring system to travel autonomously in the field (specific region).

Next, with reference to, e.g., FIG. 4, the following describes details of the configuration of the tractor 1 that enables the autonomous travel. Specifically, the tractor 1 of the present embodiment includes the position measuring antenna 6, a wireless communication antenna 48, various sensors, and a memory unit 55, for example. In addition, the tractor 1 of the present embodiment includes an inertial measurement unit 53 and an inclination threshold determination unit 50 as a configuration that suppresses or reduces slip-down of the traveling body 2 on an inclined plane to enable safe autonomous travel.

The position measuring antenna 6 receives a signal from a positioning satellite included in the position measuring system such as a global navigation satellite system (GNSS). As illustrated in FIG. 1, the position measuring antenna 6 is disposed on the top face of a roof 5 provided on the cabin 11 of the tractor 1. A position measuring signal received by the position measuring antenna 6 is inputted to a position information calculating unit 49 illustrated in FIG. 4. The position information calculating unit 49 calculates the position information on the traveling body 2 (to be exact, the position measuring antenna 6) of the tractor 1 as latitude/longitude information, for example. The position information obtained by the position information calculating unit 49 is stored in the memory unit 55. The position information is read by the control unit 4 at an appropriate timing, and the position information is used for autonomous travel.

Although the present embodiment adopts a high-accuracy global navigation satellite system using a global navigation satellite system real-time kinematic (GNSS-RTK), this is not limitative. Other position measuring systems may be adoptable as long as a position coordinate can be obtained with a high accuracy. For instance, a differential global positioning system (DGPS) or a satellite-based augmentation system (SBAS) is available.

The wireless communication antenna 48 receives a signal from the wireless communication terminal 46 operated by the user, and transmits a signal to the wireless communication terminal 46. As illustrated in FIG. 1, the wireless communication antenna 48 is disposed on the top face of the roof 5 provided on the cabin 11 of the tractor 1. A signal outputted from the wireless communication terminal 46 and received by the wireless communication antenna 48 is subjected to signal processing in a wireless communication unit 40 shown in FIG. 4, and then is inputted to the control unit 4. A signal from the control unit 4 and/or the like to the wireless communication terminal 46 is subjected to signal processing by the wireless communication unit 40, and then is transmitted from the wireless communication antenna 48, so that the signal is received by the wireless communication terminal 46.

The inertial measurement unit 53 is capable of identifying a posture (a roll angle, a pitch angle, and a yaw angle) of the traveling body 2. Based on the information on the posture of the traveling body 2 measured by the inertial measurement unit 53, it is possible to work out an inclination of the field.

The inclination threshold determination unit 50 obtains the current inclination degree (the degree of the inclination determined based on a roll angle and a pitch angle) of the traveling body 2 from the detection result of the inertial measurement unit 53, and determines whether or not the current inclination degree exceeds a first threshold. As will be described in detail later, the control unit 4 controls the vehicle speed of the traveling body 2 at the time of making a turn, based on the detection result of the inclination threshold determination unit 50.

Stored in the memory unit 55 is a travel route (path) P where the tractor 1 performs autonomous travel. The travel route P is made by alternately connecting autonomous work paths (routes where farm work is performed) each being in a linear or a polygonal line shape and arcuate connection paths (turning paths) P2 used for turn. In addition, in the memory unit 55, position information (travel trajectory) on the tractor 1 that is performing autonomous travel and information on the posture of the traveling body 2 associated with the position information are stored. In addition to them, various types of information required to cause the tractor 1 to perform autonomous travel and autonomous work are stored in the memory unit 55.

As illustrated in FIG. 3, the wireless communication terminal 46 of the present embodiment is provided as a tablet personal computer. For example, the user outside the tractor 1 can view and check the information (e.g., information from various sensors attached to the robot tractor 1) displayed on the display 37 of the wireless communication terminal 46. In addition, the user can operate hardware keys 38 arranged adjacent to the display 37, a touch panel 39 arranged to cover the display 37, and/or the like to transmit a control signal for controlling the tractor 1 to the control unit 4 of the tractor 1. Examples of the control signals outputted from the wireless communication terminal 46 to the control unit 4 include signals regarding the route for autonomous travel and autonomous work, and signals for start, stop, termination, emergent stop, temporary stop, and restart after the temporary stop. However, this is not imitative.

The wireless communication terminal 46 is not limited to the tablet personal computer. Instead of this, the wireless communication terminal 46 may be a laptop personal computer. Alternatively, in a case where the robot tractor 1 and a manned tractor perform cooperative work, the monitor 14 mounted on the manned tractor may be a wireless communication terminal.

The tractor 1 configured as above is capable of performing farm work with the work machine 3 while traveling autonomously along a route in the field according to the operator's instruction given with the wireless communication terminal 46.

Specifically, the user can perform various settings with the wireless communication terminal 46 to generate an autonomous travel route P that is a series of routes made by alternately connecting autonomous work paths (liner routes where autonomous work is performed) P1 each being in a linear or a polygonal line shape and arcuate connection paths (turning paths where the tractor 1 makes a turn and/or performs switch back) P2 each connecting corresponding ones of the ends of the work routes P1.

FIG. 5 illustrates an example of the autonomous travel route P. The autonomous travel route P is generated so as to connect a work start position S and a work end position E, each of which is designated in advance. FIG. 5 is a view schematically illustrating an example of the autonomous travel route P generated by the route generating system 99. As illustrated in FIG. 5, the autonomous travel route P is generated such that headlands (second regions) and unplowed regions (side margins), which are non-work regions where the work machine 3 does not perform work, are set in the field (specific region) and a region obtained by subtracting the non-work regions from the field is set as a work region (first region). The autonomous work paths (routes) P1 are generated so as to be arranged side by side in the work region (first region), whereas the connection paths P2 are generated so as to be arranged in the headlands (second regions), which are the non-work regions. In the present embodiment, a region obtained by combining the non-work regions with the work region is referred to as the "specific region".

By inputting (transmitting), to the control unit 4, the information on the above autonomous travel route P and performing a predetermined operation, the user can allow the control unit 4 to control the tractor 1 such that the tractor 1 travels autonomously along the autonomous travel route P and the work machine 3 performs farm work along the autonomous work paths P1.

With mainly reference to FIG. 4, the following describes further details of the wireless communication terminal 46, which includes main constituent elements of the route generating system 99 according to the one embodiment of the present invention.

As illustrated in FIGS. 3 and 4, the wireless communication terminal 46 of the present embodiment includes the display 37, the hardware keys 38, and the touch panel 39, as well as main elements such as a display control unit 31, a memory unit 32, a route generating unit 35, a work vehicle setting unit 36, a field information setting unit 45, a work information setting unit 47, the inclination threshold determination unit 54, and a turning radius designating unit 59, for example.

The display control unit 31 generates display data that is displayed on the display 37, and controls the display screen to be switched from one to another appropriately. The display control unit 31 can generate an entry/selection screen 60 as an initial screen (menu screen) as shown in FIG. 6, and can display the entry/selection screen 60 on the display 37. In response to a predetermined operation performed on the entry/selection screen 60, the display control unit 31 can generate entry screens 70, 80, and 90 (described later), and can switch the display screen of the display 37 between the entry screens 70, 80, and 90.

The route generating unit 35 generates a route that is to be inputted (transmitted) to the tractor 1. The route generating unit 35 of the present embodiment generates the autonomous travel route P along which the tractor 1 is caused to travel autonomously. In a case where work vehicle information, field information, and work information (each will be described below) are entered and a predetermined operation is performed, the route generating unit 35 automatically generates the autonomous travel route P. The route generating unit 35 generates (calculates) the autonomous travel route P in consideration of slide-down of the tractor 1 (traveling body 2) that may occur by its own weight, if necessary. The autonomous travel route P thus generated is stored in the memory unit 32.

The work vehicle setting unit 36 accepts the work vehicle information (the information on the traveling body 2 and the work machine 3) entered on the work vehicle information entry screen 70, which will be described later. The work vehicle information set by the work vehicle setting unit 36 is stored in the memory unit 32.

The field information setting unit 45 accepts the field information (the information on the field) and/or the like entered on the field information entry screen 80, which will be described later. The field information set by the field information setting unit 45 is stored in the memory unit 32.

Specifically, the field information setting unit 45 of the present embodiment includes a field shape obtaining unit 52, an altitude information obtaining unit 56, a traveling direction setting unit 57, and a region setting unit 58.

The field shape obtaining unit 52 obtains the (planar) shape of the field, e.g., by causing the tractor 1 to travel along the outer periphery of the field to go around the field once and recording transitions of the position of the position measuring antenna 6 during the traveling. The shape of the field obtained by the field shape obtaining unit 52 is stored in the memory unit 32. However, the way of obtaining the shape of the field is not limitative. Alternatively, for example, the shape of the field may be obtained as a polygon identified based on a so-called cycle graph in which line segments connecting the points corresponding to the recorded position information on the corners of the field do not intersect one another.

The altitude information obtaining unit 56 obtains, e.g., by loading map data, altitude information on various points in the field having been registered by the field shape obtaining unit 52.

The traveling direction setting unit 57 obtains a traveling direction of the tractor 1 designated by the user.

The region setting unit 58 sets, in the field (specific region), the work region (first region) and the headlands (second regions) based on the work vehicle information (specifically, information on the turning radius) set by the work vehicle setting unit 36, the altitude information on the various points of the field obtained by the altitude information obtaining unit 56, and the traveling direction (work direction) set by the traveling direction setting unit 57. The region setting unit 58 sets the headlands (second regions) respectively on first and second sides of the work region (first region) in the traveling direction. The region setting unit 58 sets the headlands (second regions) in consideration of the sizes of the headlands required for the tractor 1 to make a turn with the preset turning radius. As will be described in detail later, in consideration of slide-down of the traveling body 2 that may occur due to the inclination of the field, the region setting unit 58 of the present embodiment can set at least one of the lengths of the headlands (hereinafter, simply referred to as "headland widths" occasionally) wider than a normally used value in a direction in parallel with the traveling direction.

The work information setting unit 47 accepts the work information (the information on the work mode and/or the like) entered on the work information entry screen 90, which will be described later. The work information set by the work information setting unit 47 is stored in the memory unit 32.

The inclination threshold determination unit 54 can determine whether or not the inclination degrees of the headlands exceed a second threshold and a third threshold based on the altitude information obtained by the altitude information obtaining unit 56. As will be described in detail later, the region setting unit 58 appropriately sets the length of the work region (first region) and the headland widths in the direction in parallel with the traveling direction, based on the determination result of the inclination threshold determination unit 54. In addition, the route generating unit 35 appropriately sets the autonomous travel route P based on the determination result of the inclination threshold determination unit 54.

The turning radius designating unit 59 accepts user's instruction on the turning radius in a case where the inclination threshold determination unit 54 determines that at least one of the inclination degrees of the headlands exceeds the third threshold. The turning radius designating unit 59 of the present embodiment can set, as the turning radius, a value larger than a reference turning radius (minimum turning radius) specific to the model of the tractor 1. Alternatively, the value may be smaller than the reference turning radius. The turning radius set by the turning radius designating unit 59 takes priority over the turning radius accepted by the work vehicle setting unit 36.

The memory unit 32 includes an involatile memory (for example, a flash ROM). The memory unit 32 can store therein the work vehicle information set by the work vehicle setting unit 36, the field information set by the field information setting unit 45, the work information set by the work information setting unit 47, and the information on the turning radius set by the turning radius designating unit 59, for example. The memory unit 32 can further store therein the information on the autonomous travel route P generated by the route generating unit 35, for example.

Figure 8:
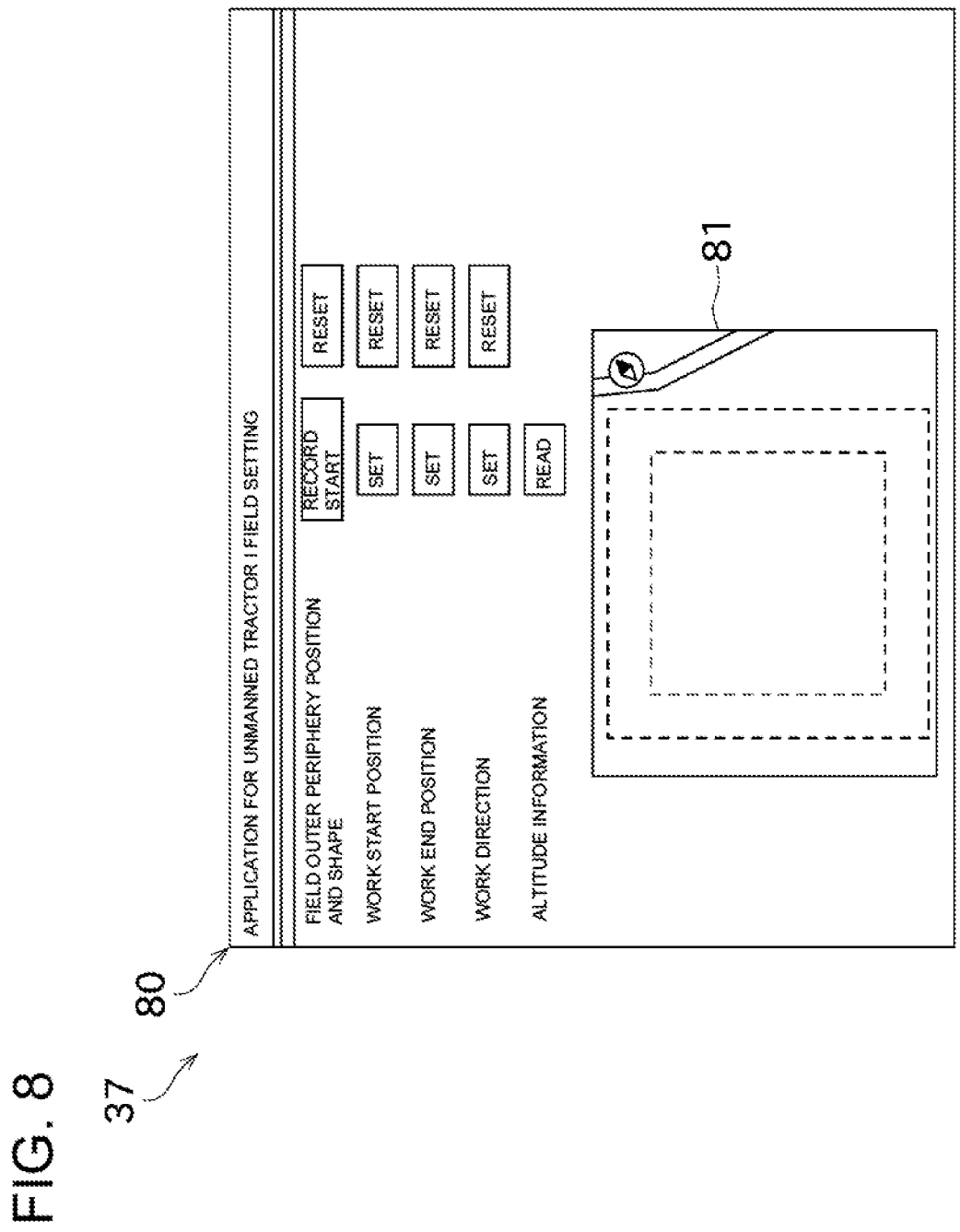
FIG. 8 A view illustrating a display example of a field information entry screen on the display of the wireless communication terminal.
Figure 11:
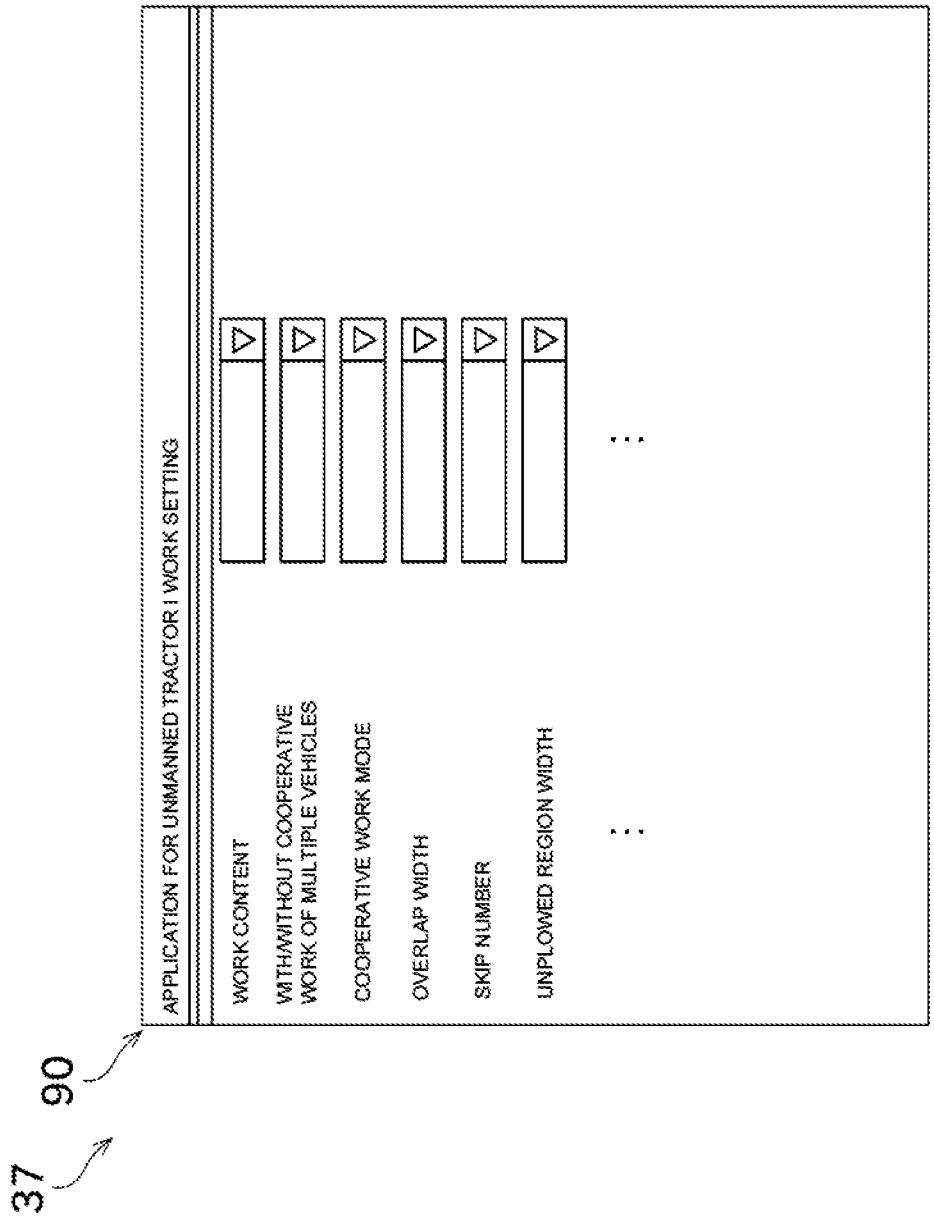
FIG. 11 A view illustrating a display example of a work information entry screen on the display of the wireless communication terminal.

With mainly reference to FIGS. 6 to 11, which illustrate screens to be displayed on the display 37 of the wireless communication terminal 46, the following describes in detail how the user operates the wireless communication terminal 46 to set the work vehicle information, the field information, the work information, and/or the like to generate the autonomous travel route P. FIG. 6 is a view illustrating a display example of the entry/selection screen 60 on the display 37 of the wireless communication terminal 46. FIG. 7 is a view illustrating a display example of the work vehicle information entry screen 70 on the display 37 of the wireless communication terminal 46. FIG. 8 is a view illustrating a display example of the field information entry screen 80 on the display 37 of the wireless communication terminal 46. FIG. 9 is a view illustrating a display example of the inclined plane countermeasure setting window 82 on the display 37 of the wireless communication terminal 46, the inclined plane countermeasure setting window 82 being used to set a countermeasure against slide-down. FIG. 10 is a view illustrating another display example of the inclined plane countermeasure setting window 82. FIG. 11 is a view illustrating a display example of the work information entry screen 90 on the display 37 of the wireless communication terminal 46.

In a step before the user starts the setting on the work vehicle information, the field information, and the work information, the display 37 of the wireless communication terminal 46 displays, as an initial screen (menu screen), the entry/selection screen 60 generated by the display control unit 31, as shown in FIG. 6. The entry/selection screen 60 mainly displays a work vehicle information entry operation section 61, a field information entry operation section 62, a work information entry operation section 63, a travel route generation/transfer operation section 64, and a farm work start operation section 65.

These operation sections are provided as virtual buttons (so-called icons) displayed on the display 37. All "buttons" in the following description refer to virtual buttons displayed on the display 37. The user may operate a desired one of these buttons by touching, with his/her finger or the like, a portion of the touch panel 39 corresponding to the region where the desired button is displayed.

First, the user operates the work vehicle information entry operation section 61 on the entry/selection screen 60 in order to enter work vehicle information. Consequently, the display screen is switched to the work vehicle information entry screen 70 illustrated in FIG. 7.

On the work vehicle information entry screen 70, it is possible to enter work vehicle information on the traveling body 2 and the work machine 3 attached to the traveling body 2. Specifically, the work vehicle information entry screen 70 includes the boxes for entering various work vehicle information. Examples of the work vehicle information encompass the model of the tractor 1, the position where the position measuring antenna 6 is attached to the traveling body 2, the lateral width of the tractor 1, the lateral width (work width) of the work machine 3, a distance from the rear edge of the three-point link mechanism (the rear end of the lower link) to the rear end of the work machine 3, a vehicle speed during work, a vehicle speed on the headland (at the time of turning), an engine speed during work, an engine speed on the headland (at the time of turning), and a turning radius.

In the present embodiment, when the model of the tractor 1 is entered, the preset values of the lateral width, the turning radius (minimum turning radius), and the like, which are preliminarily stored in association with the model, are automatically entered into the boxes. However, the user may set a value different from the preset value, e.g., by operating a pull-down menu in each box and/or directly entering a numerical value into each box.

When all of the items on the work vehicle information entry screen 70 are entered and the user operates a "confirm vehicle setting" button (not shown) thereon, the work vehicle information is accepted by the work vehicle setting unit 36, and is stored in the memory unit 32, so that the setting of the work vehicle information is completed.

Specifically, settings on the information on the vehicle speed during work (first vehicle speed) and the information on the vehicle speed on the headland (second vehicle speed) among the work vehicle information are accepted by a vehicle speed setting unit (not shown) of the work vehicle setting unit 36.

When the user operates the field information entry operation section 62 on the entry/selection screen 60 shown in FIG. 6 appearing again after the user has ended the setting on the work vehicle information, the display screen of the display 37 is switched to the field information entry section 80 shown in FIG. 8.

On the field information entry screen 80, it is possible to enter information on a specific region (field) where the traveling body 2 travels. Specifically, the field information entry screen 80 includes a plane surface display section 81, which displays the shape of the field by graphics (graphically). The field information entry screen 80 includes a box "field outer periphery position and shape" with "record start" and "reset" buttons. The field information entry screen 80 further includes boxes "work start position", "work end position", and "work direction" each with "set" and "reset" buttons. The field information entry screen 80 also includes a box "altitude information" with a "read" button.

If the "record start" button for the "field outer periphery position and shape" is operated, the wireless communication terminal 46 is switched to a field shape record mode. In the field shape record mode, when the tractor 1 travels along the outer periphery of the field to go around the field once, for example, the field shape obtaining unit 52 records transitions of the position of the position measuring antenna 6 during the traveling. Thus, the field shape obtaining unit 52 obtains (calculates) the shape of the field. In this manner, it is possible to designate the position and shape of the field. The position and shape of the outer periphery of the field calculated (designated) in this manner are graphically displayed on the plane surface display section 81. By operating the "reset" button, it is possible to record (designate) the position of the outer periphery of the field again.

If the "set" button for the "work start position" is operated, the shape of the field obtained in the above-described manner is displayed on the plane surface display section 81 of the field information entry screen 80 so as to overlap map data. In this state, the user may select any point near the contour of the field, so that the position information near the selected point can be set as the work start position. The "work end position" can be set in a similar manner to the "work start position".

If the "set" button for the "work direction" is operated, the shape of the field, the work start position, and the work end position obtained in the above-described manner are displayed on the plane surface display section 81 of the field information entry screen 80 so as to overlap map data. In this state, the user may select any two points on the contour of the field, for example, so that a direction of a line connecting the two points can be set as the work direction. The work direction (traveling direction) thus set is accepted by the traveling direction setting unit 57.

If the "read" button for the "altitude information" is operated, a window for designating a file (not shown) is displayed. In this state, by attaching to the wireless communication terminal an external memory in which a file describing altitude distribution data is stored and designating this file, the altitude information obtaining unit 56 can obtain the altitude information. The content of the altitude distribution data can be numerical data indicative of the elevation obtained by, e.g., airborne laser scanning performed with a mesh unit of several meters. However, this is not limitative. Alternatively, for example, the altitude distribution data may be data indicative of the positions and shapes of contour lines on the map. The information on the altitude distribution is obtained by the altitude information obtaining unit 56, and the altitude information obtaining unit 56 can perform a calculation to obtain the inclinations at various points in the field.

When the settings on all the items on the field information entry screen 80 are completed, the inclination threshold determination unit 54 determines whether or not the inclination degree of the field (headland) exceeds the second threshold. Unless otherwise stated, the inclination degree of the field (headland) in the following description refers to a pitch-component inclination in the work direction (traveling direction). If the inclination threshold determination unit 54 determines that at least one of the inclination degrees of the headlands exceeds the second threshold, an inclined plane countermeasure setting window 82 is displayed so as to overlap the field information entry screen 80, as illustrated in FIG. 9. More specifically, in a case where a headland is inclined lower toward the outer side of the field, there is a possibility that the traveling body 2 may slide down by a centrifugal force and its own weight while making a turn on the headland and accordingly depart outside the field. In order to prevent this situation, the inclined plane countermeasure setting window 82 proposing the user to perform a region setting for increasing the headland width is displayed.

For example, the inclined plane countermeasure setting window 82 displays a countermeasure for reducing slip-down together with the following message: "Pitch-direction inclination in work direction has been detected. Please select countermeasure against slip-down at the time of turning on headland." Specifically, the inclined plane countermeasure setting window 82 of the present embodiment displays a countermeasure "increase headland width" with a check box on the left side thereof. Via the check box, the user can give an instruction to conduct this countermeasure. If the user puts a check mark in this check box, an input box displayed on the right side becomes possible to accept an entry of a headland width. At the time when the inclined plane countermeasure setting window 82 is displayed, a value is preset in the box for entering the headland width. This preset value is obtained by a calculation appropriately performed based on the turning radius set by the work vehicle setting unit 36, the altitude information (inclination degree) obtained by the altitude information obtaining unit 56, and the traveling direction obtained by the traveling direction setting unit 57 in order to effectively prevent slide-down. However, the user can set a value different from the preset value, by performing a touch operation on this box with his/her finger or the like.

If the inclination threshold determination unit 54 determines that at least one of the inclination degree of the headlands exceeds not only the second threshold but also the third threshold, the inclined plane countermeasure setting window 82 displays the countermeasure "increase headland width" as well as a countermeasure "change turning radius", as illustrated in FIG. 10. Also for this countermeasure, a check box is provided. If the user puts a check mark in this check box, an input box displayed on the right side becomes possible to accept an entry of an arbitrary turning radius. At the time when the inclined plane countermeasure setting window 82 is displayed, a value is preset in the box for entering the turning radius. This preset value is obtained by a calculation appropriately performed based on the altitude information (inclination degree) obtained by the altitude information obtaining unit 56 and the traveling direction obtained by the traveling direction setting unit 57 in order to effectively prevent slide-down. Alternatively, the user can set a value different from the preset value, by performing a touch operation on this box with his/her finger or the like. The information on the turning radius designated in this box is accepted by the turning radius designating unit 59.

In the present embodiment, the countermeasures for preventing the slide-down of the traveling body 2 can be selected alone or in combination. The user may put check marks in the desired check boxes as illustrated in FIG. 10, for example. After that, the user may operate a "register" button in a lower portion of the inclined plane countermeasure setting window 82.

In response to the operation of the "register" button, the region setting unit 58 sets the work region (first region) and the headlands (second regions) in the field (specific region) so as to achieve the headland width designated on the inclined plane countermeasure setting window 82 and/or the turning radius accepted by the turning radius designating unit 59. Specifically, for example, in order that the work region and the headlands are not extended outside the field, the headland width designated on the inclined plane countermeasure setting window 82 is achieved by increasing the headland width, rather than by reducing the length of the work region in the traveling direction as needed.

In a case where the headlands on the first and second sides of the field in the traveling direction have a difference of altitude, the region setting unit 58 of the present embodiment sets (increases) the width L2 of the headland determined to be on the lower side (down-side) such that the width L2 matches the headland width having been set on the inclined plane countermeasure setting window 82, whereas the region setting unit 58 sets the width L1 of the headland on the higher side (up-side) to be a headland width smaller than the value set for the lower side (e.g., a minimum width determined based on the turning radius) (L1<L2).

When the user operates the work information entry operation section 63 on the entry/selection screen 60 shown in FIG. 6 appearing again after the user has ended the setting on the field information and the setting on the countermeasure against the inclined plane if needed, the display screen is switched to the work information entry screen 90 illustrated in FIG. 11.

A box "work content" on the work information entry screen 90 allows selection of work to be performed, among tilling work, ground leveling work, fertilizing work, seeding work, chemical agent application work, herbicide application work, and the like. By operating a pull-down menu in this box, the user can set desired autonomous work to be performed by the tractor 1.

A box "with/without cooperative work of multiple vehicles" on the work information entry screen 90 allows selection of whether to perform work by multiple tractors (e.g., two vehicles including the robot tractor 1 and a manned tractor) in a single field (i.e., whether to perform cooperative work). By operating a pull-down menu in this box, the user can set "with cooperative work" or "without cooperative work". Note that the box "with/without cooperative work of multiple vehicles" may be omitted.

A box "cooperative work mode" on the work information entry screen 90 becomes available only when "with cooperative work" is set in the box "with/without cooperative work of multiple vehicles". The box "cooperative work mode" allows selection of which type of work to perform, among cooperative work (track cooperative work) in which multiple tractors travel on respective different autonomous work paths P1, cooperative work (following cooperative work) in which multiple tractors travel on the same autonomous work path P1, and the like. By operating a pull-down menu in this box, the user can set a desired one of the cooperative work modes.

A box "overlap width" on the work information entry screen 90 allows setting on a width (overlap amount) allowing overlap of the widths of adjacent ones of the autonomous work paths P1 where the work machine 3 travels. By operating a pull-down menu in this box or directly entering a numerical value, the user can set the overlap amount.

A box "skip number" on the work information entry screen 90 allows selection of the number of autonomous work paths to be interposed between an arbitrary autonomous work path P1 in the autonomous travel route P, along which the tractor 1 is to travel, and another autonomous work path P1 along which the tractor 1 is to travel subsequently to the arbitrary autonomous work path P1 (the number of rows of paths to be skipped during work). In the present embodiment, by operating a pull-down menu in this box, the user can set the skip number.

A box "unplowed region width" on the work information entry screen 90 allows setting on the widths of the non-work regions (i.e., unplowed regions, which may also be called as side margins) located on two ends of the travel region in a direction along which the autonomous work paths P1 for the tractor 1 are arranged side by side. In this box, a recommended width is set preliminarily. However, by operating a pull-down menu in this box, the user can set, as the unplowed region width, a value that is an integral multiple of the work width, for example. However, this is not limitative. Alternatively, the user may directly enter a desired numerical value for the unplowed region width.

When the user enters information in all or some of the boxes on the work information entry screen 90 as needed and operates a "confirm" button (not shown), the work information is accepted by the work information setting unit 47, and the entry/selection screen 60 illustrated in FIG. 6 is displayed again. When the user selects the travel route generation/transfer operation section 64 in this state, an autonomous travel route P for the tractor 1 is automatically generated, and the autonomous travel route P thus generated is stored in the memory unit 32. In a case where the user has selected the countermeasure(s) for preventing slid-down on the inclined plane, the autonomous travel route P is generated in consideration of the countermeasure(s). Specifically, generated in this case is the autonomous travel route P including the connection paths P2 with which the turning radius designated by the turning radius designating unit 59 can be achieved.

When the autonomous travel route P is generated, a "path simulation" button is displayed on the display screen of the display 37 in a selectable manner. When the "path simulation" button is operated, an image expressing the generated autonomous travel route P with, e.g., arrows and lines is displayed. Instead of the image, an animation of a tractor moving along the autonomous travel route P may be displayed.

In addition, a "transfer data" button and a "return to entry/selection screen" button are displayed on the display screen of the display 37 in a selectable manner. Selecting the "transfer data" button can give an instruction to transmit the information on the autonomous travel route P to the tractor 1. Selecting the "return to entry/selection screen" button switches the display screen to the entry/selection screen 60.

As described above, with the route generating system 99 of the present embodiment, the information on the autonomous travel route P generated by the wireless communication terminal 46 can be transmitted to the control unit 4 of the tractor 1. The control unit 4 stores, in the memory unit 55 electrically connected to the control unit 4, the information on the autonomous travel route P received from the wireless communication terminal 46.

After the information on the autonomous travel route P generated by the wireless communication terminal 46 is transmitted to the tractor 1, the user may steer the tractor 1 to bring the tractor 1 to the work start position S and operate the farm work start operation section 65 on the entry/selection screen 60. Consequently, the tractor 1 starts autonomous travel along the autonomous travel route P. While the tractor 1 is performing autonomous travel, the display 37 of the wireless communication terminal 46 displays a monitoring screen including an image transmitted from a camera (not shown) of the traveling body 2. The user views the monitoring screen and transmits a control signal to the tractor 1 as needed. In this manner, the user continuously monitors the tractor 1 that is performing autonomous travel.

Figure 12:
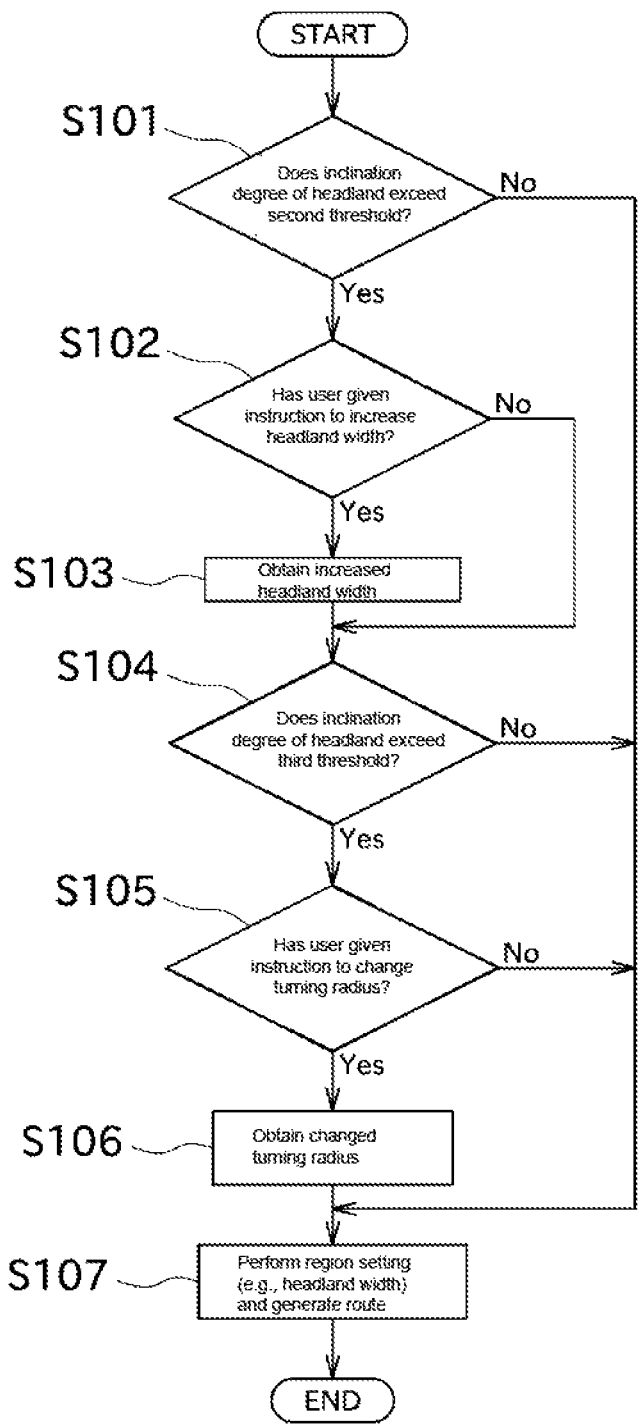
FIG. 12 A flowchart illustrating a process, performed by the wireless communication terminal, for generating an autonomous travel route by performing a region setting in consideration of slide-down of a traveling body on a headland.

Next, with reference to the flowchart in FIG. 12, the following describes details of a process, performed by the wireless communication terminal 46, for achieving a region setting in consideration of slide-down of the traveling body 2 on the headland and generating a suitable autonomous travel route P in a case where the field (specific region) has an inclination component (a difference of altitude) that is equal to or greater than a certain level when viewed in the traveling direction. FIG. 12 is a flowchart illustrating a process, performed by the wireless communication terminal 46, for generating an autonomous travel route P adapted to an inclined plane, by performing the region setting in consideration of the slide-down of the traveling body 2 on the headland.

First, in step S101, the inclination threshold determination unit 54 determines whether or not the inclination degree of the field (headland) exceeds the second threshold (e.g., 1.5°) based on the altitude information obtained by the altitude information obtaining unit 56. If the inclination degree of the field (headland) is determined to be equal to or less than the second threshold (No in step S101), the region setting unit 58 performs settings on the work region and the headlands based on the turning radius having been set by the work vehicle setting unit 36 and the traveling direction having been set by the traveling direction setting unit 57. Namely, in this case, the possibility that the traveling body 2 may slide down on the headland is low, and therefore any particular process such as increasing the headland width is not performed. Rather, the settings on the work region and the headlands are performed in a general manner. Then, the route generating unit 35 generates an autonomous travel route P including linear autonomous work paths P1 arranged side by side in the work region and turning connection paths P2 arranged side by side in the headlands (step S107).

Meanwhile, if step S101 determines that the inclination degree of the field (headland) exceeds the second threshold (Yes in step S101), the display control unit 31 of the wireless communication terminal 46 causes the display 37 to display the inclined plane countermeasure setting window 82 (see FIG. 9) to inquire of the user as to if the user wishes to widen the headland as a countermeasure against slide-down of the traveling body 2 (step S102).

If the user gives an instruction to widen the headland in response to the inquiry in step S102 (Yes in step S102), the region setting unit 58 obtains an increased headland width having been entered on the screen of the inclined plane countermeasure setting window 82 (or a preset value obtained by a calculation appropriately performed to effectively prevent the slide-down) (step S103). After that, the procedure advances to step S104.

Meanwhile, if the user does not give an instruction to widen the headland in response to the inquiry in step S102 (No in step S102), the procedure skips step S103 and advances to step S104.

In step S104, the inclination threshold determination unit 54 determines whether or not the inclination degree of the field (headland) exceeds the third threshold (e.g., 2°) based on the altitude information obtained by the altitude information obtaining unit 56. If the inclination degree of the field (headland) is determined to be equal to or less than the third threshold (No in step S104), the region setting unit 58 performs settings on the work region and the headlands based on the turning radius having been set by the work vehicle setting unit 36, the traveling direction having been set by the traveling direction setting unit 57, and the headland width obtained in step S104. Namely, in this case, the field has a pitch inclination component that is equal to or greater than a certain level when viewed in the traveling direction, and thus the traveling body 2 may potentially slide down on the headland. Therefore, if the user gives an instruction to increase the headland width, the settings on the work region and the headlands are performed according to the increased headland width. The region setting unit 58 of the present embodiment applies the increased headland width obtained in step S103 only to the headland on the down-side where the traveling body 2 may slide down by its own weight and depart outside the field with high probability. This can prevent the traveling body 2 from departing outside the field even when the traveling body 2 slides down on the headland on the down-side.

Meanwhile, if step S104 determines that the inclination degree of the field (headland) exceeds the third threshold (Yes in step S104), the display control unit 31 of the wireless communication terminal 46 causes the display 37 to display the inclined plane countermeasure setting window 82 as illustrated in FIG. 10 to inquire of the user as to if the user wishes to change the turning radius as a countermeasure against slide-down of the traveling body 2 (step S105).

If the user gives an instruction to change the turning radius in response to the inquiry in step S105 (Yes in step S105), the turning radius designating unit 59 obtains a changed turning radius having been entered on the screen of the inclined plane countermeasure setting window 82 (or a preset value obtained by a calculation appropriately performed to effectively reduce the slide-down) (step S106). After that, the procedure advances to step S107.

Meanwhile, if the user does not give an instruction to change the turning radius in response to the inquiry in step S105 (No in step S105), the procedure skips step S106 and advances to step S107.

In step S107, the region setting unit 58 performs settings on the work region and the headlands based on the increased headland width obtained in step S103, the changed turning radius obtained in step S106, and the traveling direction set by the traveling direction setting unit 57. Namely, in this case, the field has a pitch inclination component that is relatively large when viewed in the traveling direction, and thus there is a possibility that the traveling body 2 may slide down on the headland. Therefore, if the user gives an instruction to increase the headland width and an instruction to change the turning radius, the settings on the work region and the headlands are performed according to the increased headland width and the changed turning radius. Here, in the present embodiment, the value preset in the box for entering the changed turning radius on the inclined plane countermeasure setting window 82 is a value larger than the reference turning radius (minimum turning radius) specific to the model of the tractor 1. This can prompt the user to change the turning radius so that it has a larger value. By changing the turning radius to have a larger value, it is possible to reduce the centrifugal force applied to the traveling body 2 at the time of turning, thereby making it possible to effectively prevent the slide-down. In addition, the route generating unit 35 generates the autonomous travel route P which includes the linear autonomous work paths P1 arranged side by side in the work region and the turning connection paths P2 arranged side by side in the headlands and with which the changed turning radius can be achieved (step S107).

According to the process described above, in a case where the autonomous travel route P along which the tractor 1 performs autonomous travel includes an inclination component (a difference of altitude) that is equal to or greater than a certain level when viewed in the traveling direction, at least one of the widths (headland widths) of the headlands in the traveling direction is increased and/or a turning radius is set larger than the reference turning radius (minimum turning radius). Consequently, it is possible to generate an autonomous travel route P with higher safety in consideration of slide-down of the tractor 1.

Figure 13:
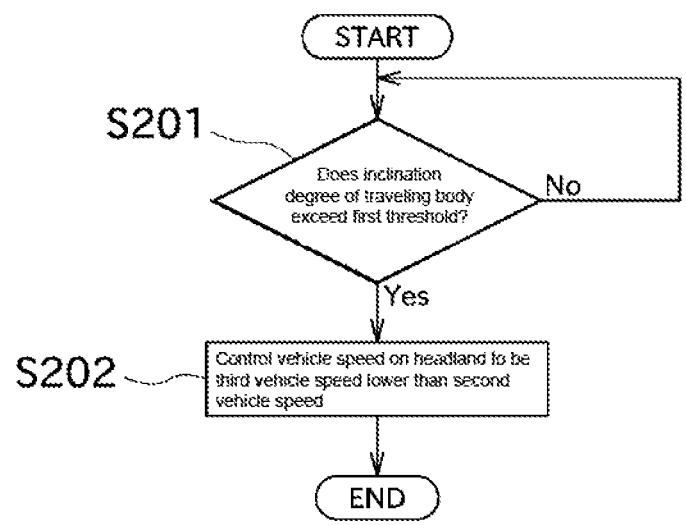
FIG. 13 A flowchart illustrating a process, performed by an autonomous travel control unit of the robot tractor, for reducing the slide-down of the traveling body on the headland.

Next, with reference to the flowchart in FIG. 13, the following describes details of a process, performed by the control unit (autonomous travel control unit) 4, for reducing slide-down of the traveling body 2 on the headland in a case where the field (specific region) has an inclination component (a difference of altitude) that is equal to or greater than a certain level when viewed in the traveling direction. FIG. 13 is a flowchart illustrating a process, performed by the control unit (autonomous travel control unit) 4 of the tractor 1, for reducing slide-down of the traveling body 2 on the headland. In the tractor 1 of the present embodiment, the process illustrated in FIG. 13 is repeatedly performed while the traveling body 2 is traveling along the connection path P2.

First, in step S201, the inclination threshold determination unit 50 of the control unit 4 reads out the detection result of the inertial measurement unit 53 to obtain the current inclination degree of the traveling body 2, and determines whether or not the current inclination degree exceeds the first threshold. The inclination degree detected here is an inclination determined based on a pitch angle and a roll angle.

If step S201 determines that the current inclination degree of the traveling body 2 is equal to or less than the first threshold (e.g., 1.2°) (No in step S201), the possibility that the traveling body 2 slides down greatly while traveling on the connection path P2 is low. Therefore, the control unit 4 does not perform any particular adjustment on the vehicle speed, but controls the traveling body 2 to achieve the vehicle speed on the headland (second vehicle speed) having been set by the work vehicle setting unit 36. Then, the control unit 4 continuously monitors the current inclination degree of the traveling body 2 (i.e., repeatedly performs the determination in step S201).

If step S201 determines that the current inclination degree of the traveling body 2 exceeds the first threshold (Yes in step S201), it can be considered that there exists a relatively great inclination component, and hence the traveling body 2 may potentially slide down by its own weight. In this case, the control unit 4 controls the traveling body 2 so that the vehicle speed of the traveling body 2 at the time of turning becomes a vehicle speed (third vehicle speed) that is lower than the vehicle speed on the headland (second vehicle speed) having been set by the work vehicle setting unit 36. Consequently, the traveling body 2 will make a turn at a lower speed. This can prevent the traveling body 2 from sliding down greatly by its own weight at the time of turning.

Figure 14:
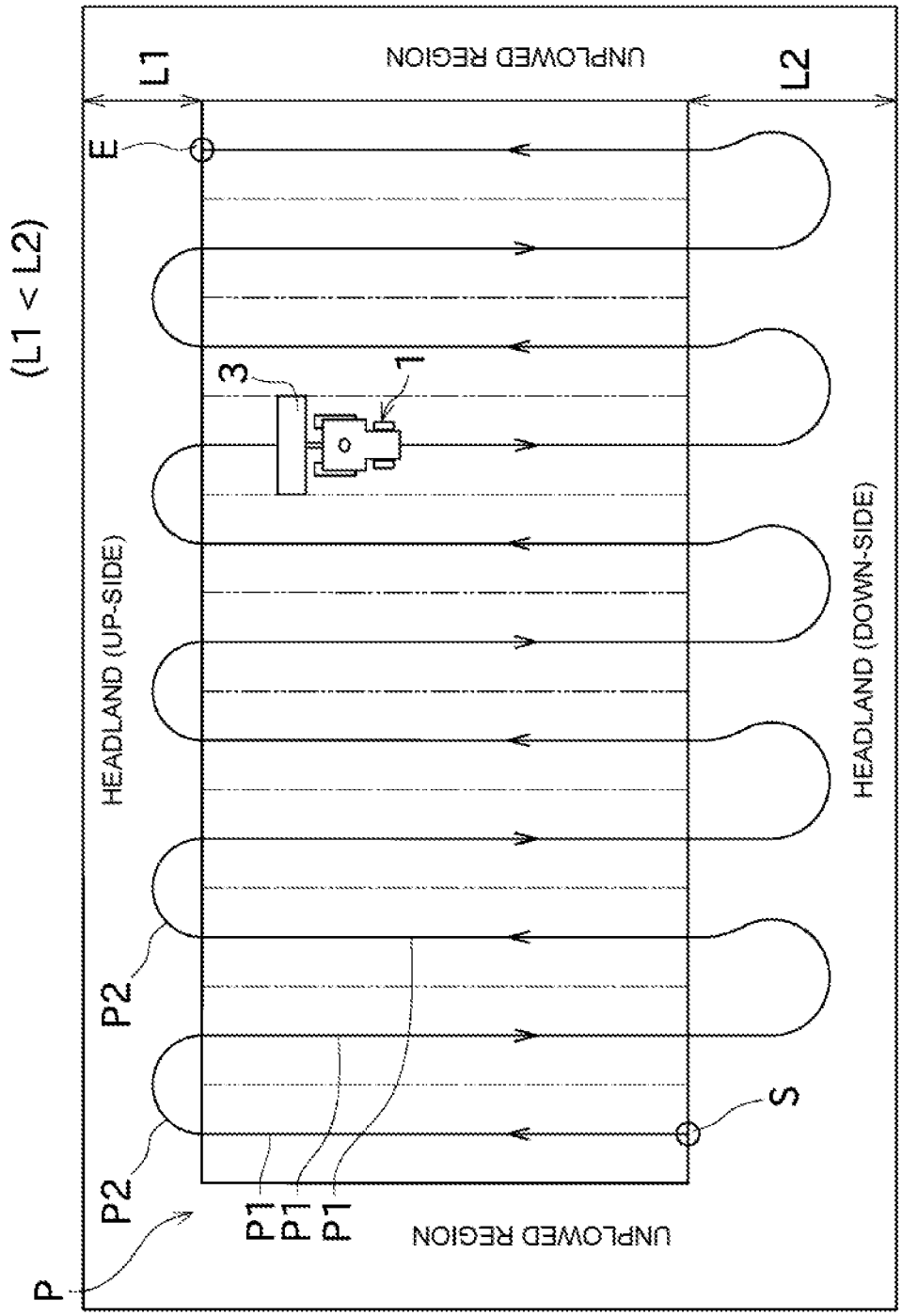
FIG. 14 A view schematically illustrating an example of an autonomous travel route generated by the route generating system in consideration of slide-down of the traveling body on the headland.

According to the route generating system 99 of the present embodiment, the process of FIG. 12 is performed. Consequently, the region setting unit 58 performs the region setting (the settings on the work region and the headlands) hardly causing slide-down of the traveling body 2 toward the outside of the field, and the route generating unit 35 generates the autonomous travel route P hardly causing the slide-down of the traveling body 2. FIG. 14 illustrates an example of the autonomous travel route P generated by the route generating system 99 of the present embodiment. FIG. 14 is a view schematically illustrating the example of the autonomous travel route P generated by the route generating system 99 in consideration of slide-down of the traveling body 2 on the headland. In the example in FIG. 14, the width L2 of the headland on the down-side in the traveling direction has been increased (L1<L2), and the turning radius of the traveling body 2 on the headland on the down-side has been set larger than a normally-used turning radius (i.e., a turning radius set in a case where the field is not an inclined plane), as is clear from comparison with FIG. 5.

In addition, according to the autonomous travel system 100 that causes the tractor 1 to perform autonomous travel along the autonomous travel route P generated by the route generating system 99 of the present embodiment, the traveling body 2 is caused to make a turn at a vehicle speed that hardly causes slide-down of the traveling body 2. As described above, the present embodiment provides the countermeasures against the slide-down of the traveling body 2 in various points. Consequently, it is possible to reduce the possibility that the tractor 1 may slide down by its own weight and depart outside the field, thereby enabling safer autonomous travel than in the conventional system.

As described above, the route generating system 99 according to the present embodiment is configured to generate an autonomous travel route (route) P along which the tractor (work vehicle) 1 performs autonomous travel. The route generating system 99 includes the work vehicle setting unit 36, the altitude information obtaining unit 56, the traveling direction setting unit 57, and the region setting unit 58. The work vehicle setting unit 36 is configured to set vehicle information (specifically, a turning radius and/or the like) on the tractor 1. The altitude information obtaining unit 56 is configured to obtain altitude information (inclination degree) on the field (specific region) where the autonomous travel route P is to be generated. The traveling direction setting unit 57 is configured to set a traveling direction of the tractor 1 in the field. The region setting unit 58 is configured to set, in the field, a plurality of regions including a work region (first region) where autonomous work paths (routes) P1 being in parallel with the traveling direction are generated and headlands (second regions) where connection paths P2 each connecting corresponding ones of the autonomous work paths P1 are generated. The region setting unit 58 sets the widths of the headlands (headland widths) based on the vehicle information, the altitude information, and the traveling direction, the widths of the headlands extending in parallel with the traveling direction.

With this, the widths of the headlands are set in consideration of the altitude information and the traveling direction. Therefore, for example, in a case where at least one of the headlands has a pitch-direction inclination when viewed in the traveling direction, it is possible to achieve the headland width determined in consideration of slide-down of the tractor 1 that may occur while the tractor 1 is making a turn on the headland. Consequently, it is possible to prevent the tractor 1 from departing outside the field.

In the route generating system 99 of the present embodiment, the region setting unit 58 sets the headlands respectively on first and second sides of the work region in the traveling direction (work direction), and the region setting unit 58 sets, among the headlands on the first and second sides, one of the headlands located on a lower side to have a width L2 larger than a width L1 of the other of the headlands located on a higher side (L1<L2), based on the altitude information.

With this, for example, in a case where the specific region is an inclined field with two headlands having a difference of altitude, it is possible to set a wider width for the one of the headlands on the lower side, on which the weight of the tractor 1 is likely to be applied toward the outside of the field. Consequently, it is possible to effectively prevent the tractor 1 from departing outside the field.

In addition, in the route generating system 99 of the present embodiment, the work vehicle setting unit 36 sets, as the vehicle information, a turning radius of the tractor 1. In order that the region setting unit 58 sets the regions (e.g., the work region and the headlands) and the route generating unit 35 generates the autonomous travel route P, the work vehicle setting unit 36 sets, as the turning radius, a turning radius larger than a preset reference turning radius (minimum turning radius) based on the altitude information and the traveling direction.

With this, in a case where at least one of the headlands has an inclination, a turning radius of the tractor 1 at the time of making a turn on the headland can be set larger. This makes it possible to prevent slide-down of the tractor 1.

In addition, the route generating system 99 of the present embodiment further includes the turning radius designating unit 59 configured to accept, as the turning radius, designation of an arbitrary turning radius. In a case where the turning radius designating unit 59 accepts the designation of the arbitrary turning radius, the work vehicle setting unit 36 sets, as the turning radius of the tractor 1, the arbitrary turning radius according to the designation.

In this manner, the user can designate the turning radius. Consequently, it is possible to take a countermeasure against the inclined plane independently of the altitude information on the field and the turning characteristics of the tractor 1.

In addition, the autonomous travel system 100 disclosed in the present embodiment causes the tractor (work vehicle) 1 to perform autonomous travel along the autonomous travel route (route) P generated by the route generating system 99 described above. In the autonomous travel system 100, the work vehicle setting unit 36 includes the vehicle speed setting unit (not shown) configured to set the first vehicle speed of the tractor 1 in the work region (first region) and the second vehicle speed of the tractor 1 on the headlands (second regions). The autonomous travel system 100 further includes the control unit (autonomous travel control unit) 4 configured to control autonomous travel of the tractor 1. The control unit 4 controls, based on the altitude information, a vehicle speed of the tractor 1 on the headlands to the third vehicle speed, which is lower than the second vehicle speed.

With this, in a case where at least one of the headlands has a pitch direction/roll-direction inclination, the vehicle speed of the tractor 1 at the time of making a turn on the headland can be controlled to be lower than a preset vehicle speed. This makes it possible to prevent the slide-down of the tractor 1.

The preferred embodiment of the present invention has been described above. However, the configurations described above can be modified as below, for example.

According to the embodiment described above, the altitude information obtaining unit 56 obtains the altitude distribution information based on the map data loaded to the wireless communication terminal 46. Alternatively, for example, it is possible to obtain transitions of the posture (a roll angle, a pitch angle, and a yaw angle) of the traveling body 2 from the detection result of the inertial measurement unit 53 observed when the tractor 1 is caused to travel around the field for the purpose of setting the position and shape of the outer periphery of the field, and to obtain (estimate) the altitude distribution information on the field based on the transitions of the posture of the traveling body 2 thus obtained. Further alternatively, the position information obtained when the tractor 1 is caused to travel around the field may be configured to include not only latitude and longitude information but also altitude information. Based on transitions of the position information, the altitude information obtaining unit 56 may obtain the altitude distribution information.

In the embodiment described above, the region setting unit 58 sets the region (specific region) such that the width L2 of the headland on the down-side in the traveling direction is larger than the width L1 of the headland on the up-side in the traveling direction. However, this is not limitative. Alternatively, for example, the headlands on the down- and up-sides may be widened to have the same width.

In the embodiment described above, the inclination threshold determination unit 50 uses the first threshold to determine the inclination degree of the traveling body 2, and the inclination threshold determination unit 54 uses the second and third thresholds to determine the inclination degree of the inclination of the field. These thresholds may be different from each other, or may be the same value. In addition, the number of the thresholds is not limited to the number in the embodiment described above.

In the embodiment described above, the turning radius designating unit 59 may also accept, as a preset value, a turning radius smaller than the reference turning radius, for example, according to the user's entry on the inclined plane countermeasure setting window 82. In a case where the user sets a small turning radius (for example, a small turning radius that may potentially cause slide-down), it is preferable to generate connection paths P2 in an autonomous travel route P to enable so-called fish tail turning so that a turning radius is substantially set large enough to prevent the slide-down.

The embodiment described above inquires of the user as to whether to take a countermeasure against the possibility of slide-down of the traveling body 2 on the headland (specifically, as to which countermeasure to take, among increasing the headland width, changing the turning radius, and both of them). However, this is not limitative. Alternatively, for example, a region setting with an increased headland width and/or generation of an autonomous travel route P with a changed turning radius may be automatically performed.

According to the embodiment described above, the control of adjusting the region setting (the setting on the headland width) and the turning radius and the control of adjusting the vehicle speed on the headland are performed in parallel as a countermeasure against the possibility that the traveling body 2 may slide down on the headland. However, this is not limitative. Alternatively, either of these controls may be performed alone.

The description of the configuration described above has mainly dealt with the control for preventing slide-down of the traveling body 2 in a case where the field has a pitch-direction inclination component when viewed in the traveling direction. Alternatively, the autonomous travel route P may be generated in consideration of slide-down of the traveling body 2 in a case where the field has not only pitch-direction inclination component but also a roll-direction inclination component. In this case, for example, the roll-direction inclination degrees of the autonomous work paths P1 may be obtained based on the altitude distribution information, and intervals between the autonomous work paths P1 may be adjusted such that adjacent ones of the autonomous work paths P1 do not overlap each other even when the traveling body 2 slides down in the work width direction. In other words, the autonomous travel route P may be generated such that the autonomous work paths P1 are arranged each with an extra space left for the slide-down in the work width direction.

In the configuration described above, the work vehicle setting unit 36, the altitude information obtaining unit 56, the traveling direction setting unit 57, and the region setting unit 58 are provided to the wireless communication terminal 46. However, these elements may be provided to either of the tractor 1 and the wireless communication terminal 46, and there is no particular limitation on this. Also, elements and configurations other than these elements may be provided to either of the tractor 1 and the wireless communication terminal 46, too.

The route generating system 99 may be used only in the process of generating a route in consideration of slide-down of the traveling body 2 on an inclined plane, and actual traveling may be performed by the user in such a manner that the user steers the tractor 1 while viewing the generated route with the wireless communication terminal 46 or the like, for example.

In the embodiment described above, it is determined whether or not a countermeasure against slide-down of the tractor 1 is necessary only based on the inclination degree of the field. However, this is not limitative. Alternatively, for example, it may be determined whether or not a countermeasure against slide-down of the tractor 1 is necessary in consideration of the hardness and/or soil quality of the field in addition to the inclination degree of the field.

The embodiment described above discloses setting a wide headland width if it is determined, based on the altitude information, that the tractor 1 may potentially slide down on the headland. However, this is not limitative. Alternatively, for example, if there is a possibility that the tractor 1 may slide down on the headland, margins around the connection paths P2 on the headlands may be set wider so that a headland width becomes larger. In this case, a map representing a correspondence relation between the inclination angle of (the headlands in) the field and the width of the margin may be prepared in advance, and the width of each margin may be determined according to the map.

REFERENCE SIGNS LIST 1 tractor (work vehicle)
36 work vehicle setting unit
56 altitude information obtaining unit
57 traveling direction setting unit
58 region setting unit
99 route generating system
P autonomous travel route (route)
P1 autonomous work path
P2 connection path

The invention claimed is:

1. A route generating system for generating a route along which a work vehicle performs autonomous travel, comprising:

a work vehicle setting unit configured to set a vehicle information on the work vehicle;

an altitude information obtaining unit configured to obtain an altitude information on a specific region where the route is to be generated;

a traveling direction setting unit configured to set a traveling direction of the work vehicle in the specific region; and a region setting unit configured to set, in the specific region, a plurality of regions including a first region where routes in parallel with the traveling direction are generated and second regions where connection paths each connecting corresponding ones of the routes are generated, wherein the region setting unit is configured to set widths of the second regions based on the vehicle information, the altitude information, and the traveling direction, the widths of the second regions extending in parallel with the traveling direction.

2. The route generating system according to claim 1, wherein the region setting unit is configured to set the second regions respectively on first and second sides of the first region in the traveling direction, and the region setting unit is further configured to set, among the second regions on the first and second sides, one of the second regions located on a lower side to have a width larger than a width of another one of the second regions located on a higher side, based on the altitude information.

3. The route generating system according to claim 1, wherein the work vehicle setting unit is configured to set, as the vehicle information, a turning radius of the work vehicle, and the work vehicle setting unit is further configured to set, as the turning radius, a turning radius larger than a preset reference turning radius based on the altitude information and the traveling direction.

4. The route generating system according to claim 3, further comprising a turning radius designating unit configured to accept, as the turning radius, a designation of an arbitrary turning radius, wherein in a case where the turning radius designating unit accepts the designation of the arbitrary turning radius, the work vehicle setting unit is configured to set, as the turning radius of the work vehicle, the arbitrary turning radius according to the designation.

5. An autonomous travel system for causing a work vehicle to perform autonomous travel along a route generated by the route generating system according to claim 1, wherein:

the work vehicle setting unit includes a vehicle speed setting unit configured to set a first vehicle speed of the work vehicle in the first region and a second vehicle speed of the work vehicle in the second regions, the autonomous travel system includes an autonomous travel control unit configured to control autonomous travel of the work vehicle, and the autonomous travel control unit is configured to control, based on the altitude information, a vehicle speed of the work vehicle in the second regions to be a third vehicle speed, which is lower than the second vehicle speed.

\* \* \* \* \*